(12) United States Patent
Luo et al.

(10) Patent No.: US 12,363,531 B2
(45) Date of Patent: Jul. 15, 2025

(54) METHODS, DEVICES AND SYSTEMS FOR AUTOMATICALLY ADDING DEVICES TO NETWORK USING WIRELESS POSITIONING TECHNIQUES

(71) Applicant: Cypress Semiconductor Corporation, San Jose, CA (US)

(72) Inventors: Hui Luo, Marlboro, NJ (US); Kalyan Dharanipragada, Fremont, CA (US); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 696 days.

(21) Appl. No.: 17/726,241

(22) Filed: Apr. 21, 2022

(65) Prior Publication Data

US 2023/0345245 A1     Oct. 26, 2023

(51) Int. Cl.
| | |
|---|---|
| *H04W 12/06* | (2021.01) |
| *H04W 4/029* | (2018.01) |
| *H04W 12/069* | (2021.01) |
| *H04W 12/63* | (2021.01) |
| *H04W 24/02* | (2009.01) |
| *H04W 76/10* | (2018.01) |
| *H04W 4/80* | (2018.01) |
| *H04W 84/12* | (2009.01) |

(52) U.S. Cl.
CPC ......... *H04W 12/069* (2021.01); *H04W 4/029* (2018.02); *H04W 12/63* (2021.01); *H04W 24/02* (2013.01); *H04W 76/10* (2018.02); *H04W 4/80* (2018.02); *H04W 84/12* (2013.01)

(58) Field of Classification Search
CPC ... H04W 12/069; H04W 12/63; H04W 24/02; H04W 4/029; H04W 4/80; H04W 76/10; H04W 84/12
See application file for complete search history.

(56) References Cited

U.S. PATENT DOCUMENTS

2018/0191728 A1*   7/2018   Kim ................. H04M 15/58

* cited by examiner

*Primary Examiner* — Nader Bolourchi

(57) ABSTRACT

A method can include, by operation of a configuring device: storing user network information in the configuring device; receiving wireless communications from a target device; authenticating the target device; indicating a pointing direction for the configuring device; executing a wireless positioning operation with the target device to generate positioning data. In response to the configuring device being determined to be pointing at the target device, automatically configuring the target device for the user network with the stored user network information. Corresponding methods for a configuring device, as well as devices and systems are also disclosed.

20 Claims, 22 Drawing Sheets

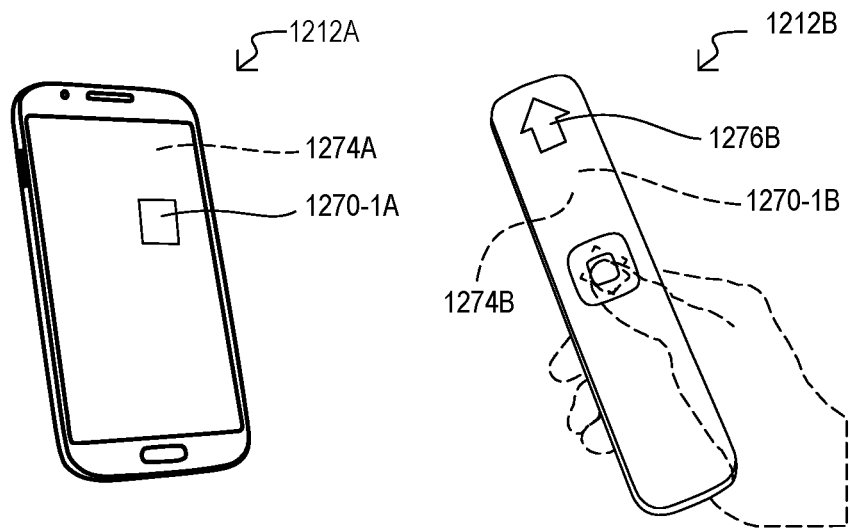
FIG. 12A
FIG. 12B
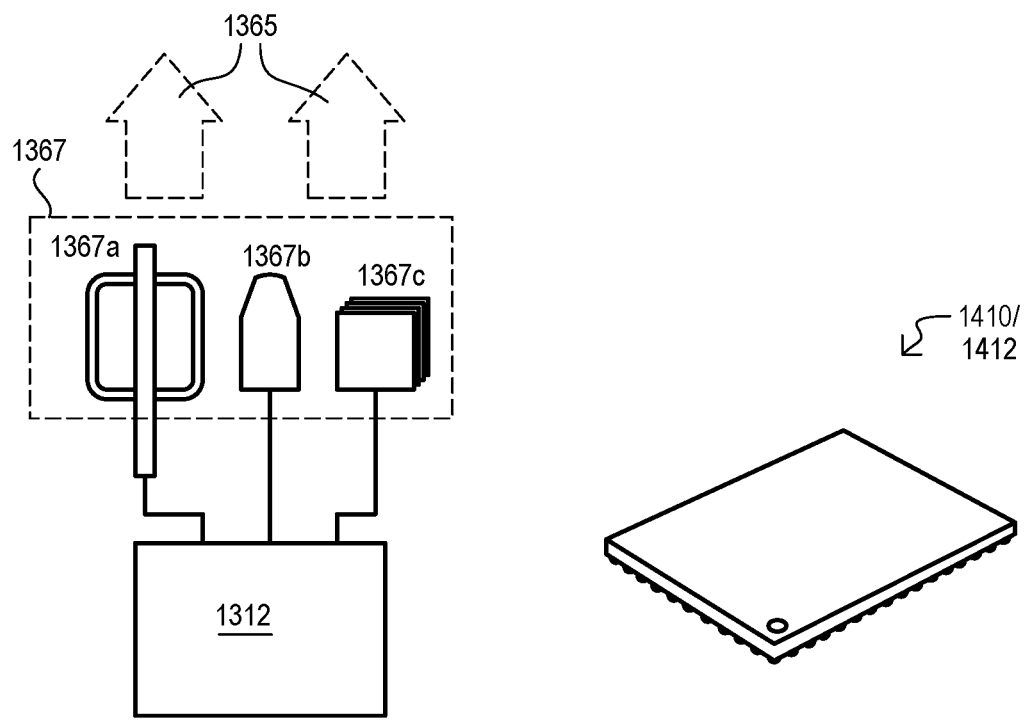
FIG. 13
FIG. 14

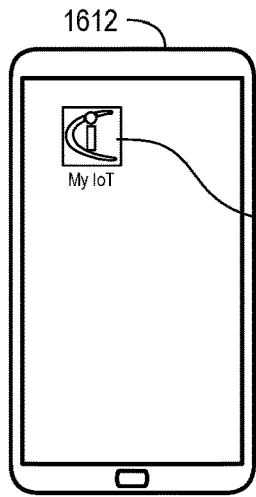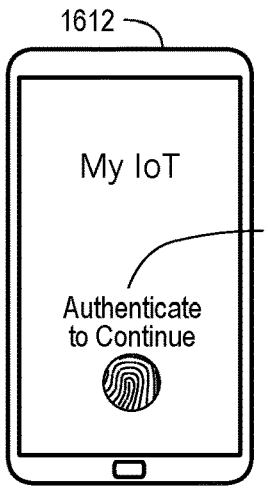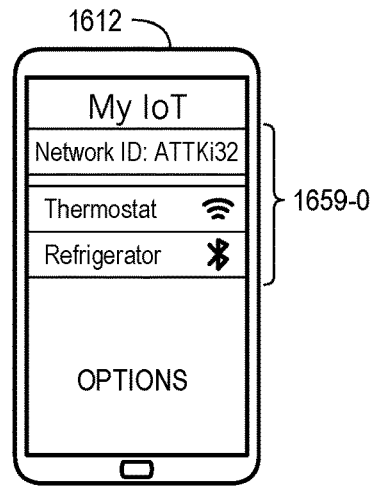
FIG. 16A   FIG. 16B   FIG. 16C
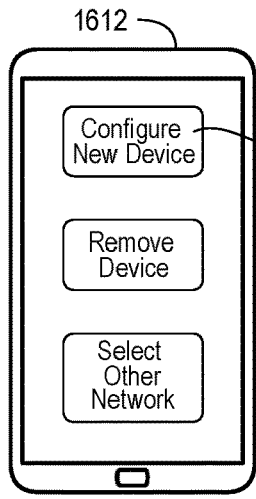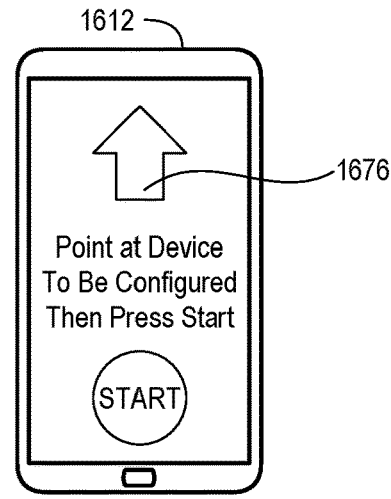
FIG. 16D   FIG. 16E
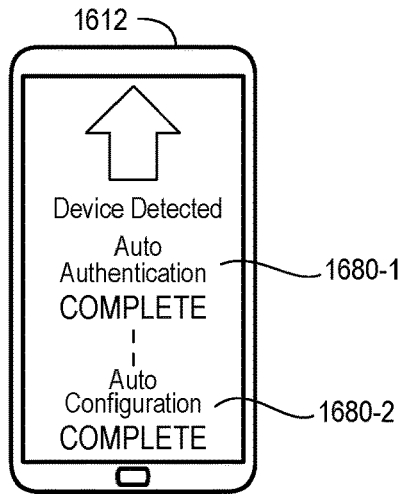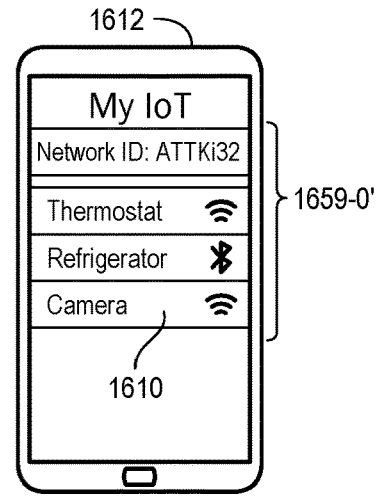
FIG. 16F   FIG. 16G

METHODS, DEVICES AND SYSTEMS FOR AUTOMATICALLY ADDING DEVICES TO NETWORK USING WIRELESS POSITIONING TECHNIQUES

TECHNICAL FIELD

The present disclosure relates generally to wireless systems, and more particular to automatically adding devices to a wireless network.

BACKGROUND

The addition of network connectivity to consumer and industrial devices, including the growing Internet of Things (IoT), has resulted in the need to frequently add new devices to user networks. Typically, manufacturers include instructions that can enable a user to manually configure a device for a network (i.e., "commission" the device). However, there is no uniformity in such applications, which can inconvenience a user. Further, having a user enter network information can present a security weakness.

Device provisioning protocols, such as Wi-Fi Easy Connect promulgated by the Wi-Fi Alliance, have been proposed to simplify the commissioning process. Such protocols are aimed at reducing the complexity of configuration through the use of QR codes, NFC tags, or information downloaded from a server. However, such provisioning protocols can still require user input in the bootstrapping phase, which can present a security weakness and sometimes present a burden to the user.

It would be desirable to arrive at an easier way to commission devices to a wireless network.

SUMMARY

Embodiments can include a method for a configuring device that includes operating a configuring device to store user network information; receive wireless communications from a target device to be configured; authenticating the target device with data from the wireless communications; indicating a pointing direction for the configuring device; and executing a wireless positioning operation with the target device. The wireless positioning operation can generate positioning data that indicates a position of the target device with respect to the configuring device. In response to the configuring device being pointed at the target device, the target device can be automatically configured for the user network with the stored user network information.

BRIEF DESCRIPTION OF THE DRAWINGS

FIGS. 12A and 12B are diagrams showing configurators according to embodiments.

FIG. 13 is a diagram of antennas that can be included on a configurator according to embodiments.

FIG. 14 is a diagram of an integrated circuit device according to an embodiment.

FIGS. 16A to 16G are diagrams showing a configuration application of a configurator according to an embodiment.

DETAILED DESCRIPTION

Embodiments can provide for a simple and secure method for adding wireless devices to an existing wireless network. Using stored public keys and/or a public key infrastructure, a configuring device (i.e., configurator) and a device to be configured (i.e., target device) can authenticate one another. A user can point the configurator at the target device. Using a wireless positioning protocol, the devices can determine when they are pointing at one another, and in response, execute an automatic configuration operation which can add the target device to the wireless network. Such an automatic configuration operation can require no user input.

In some embodiments, a wireless positioning protocol can utilize multiple antenna readings to generate wireless positioning data.

In some embodiments, a wireless positioning protocol can include any of a channel state information protocol, angle of attack protocol, angle of departure protocol and fine time measurement protocol.

In some embodiments, a configurator can advertise an automatic configuration service that includes a digital certificate. A target device can authenticate the configurator with a stored key and/or access a key through a secure channel established with the configurator.

Figure 1:
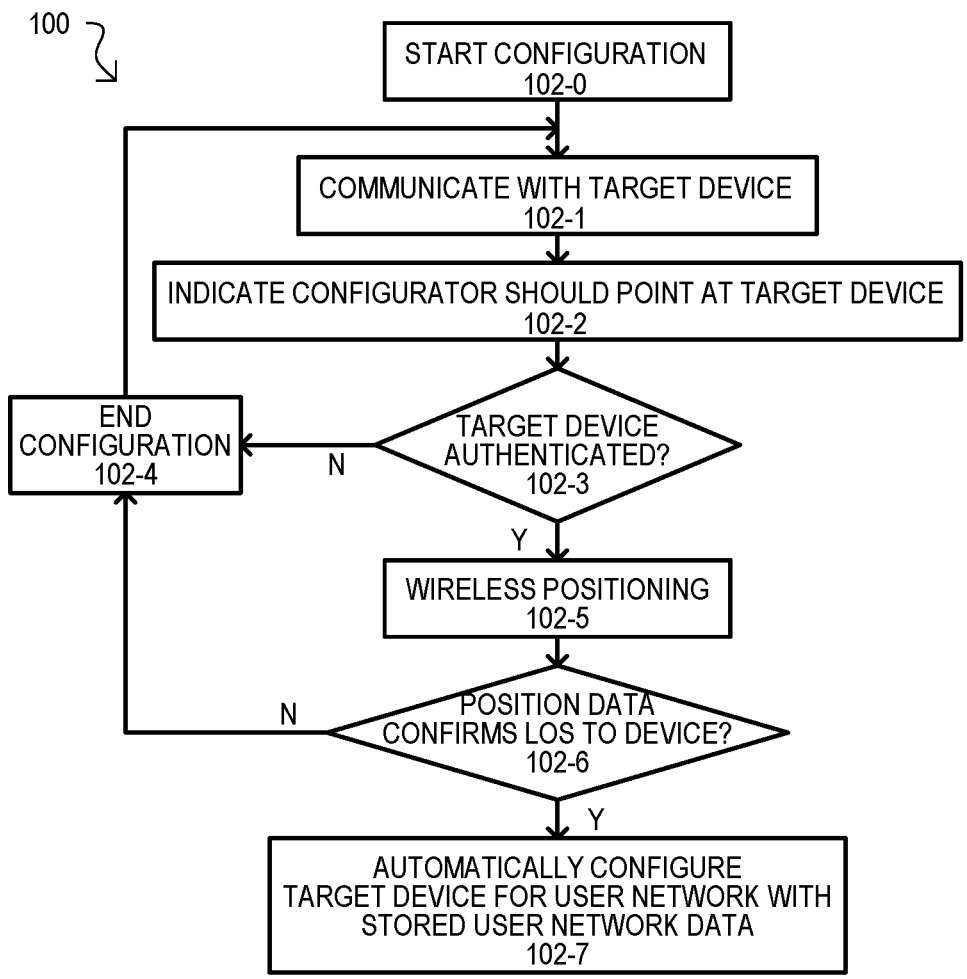
FIG. 1 is a flow diagram of a method for a configuring device (configurator) according to an embodiment.

FIG. 1 is a flow diagram of a method 100 according to an embodiment. A method 100 can be executed by a configurator device to automatically configure a target device to operate with a wireless network. A method 100 can include starting a configuration operation 102-0. A configuration operation can start with any suitable action, including but not limited to: a user starting a configuration application, a user activating a predetermined input of a configurator device, or a user powering up a configurator device. A configurator can communicate with a target device 102-1. Such an action can include wireless communications with a target device. A target device can respond to a configurator and/or a configurator can respond to a target device. In some embodiments, such an action can include generating or responding to a broadcast (e.g., advertisement) type transmission.

A method 100 can include a configurator indicating that is should point at a target device 102-2. Such an action can include providing a direction indicator on the configurator device. Such a direction indicator can take any suitable form, including but not limited to: a symbol on a display, one or more lights, a label, an embossing, an audio indication, and/or audio or text directions.

A method 100 can authenticate a target device 102-3. In some embodiments, such an action can include a configurator decrypting a security certificate or the like, received from the target device. In some embodiments, such an action can include using a key indicated with a public key infrastructure, but other embodiments can include using known, secure private keys. If a target device cannot be authenticated (N from 102-3), a configuration operation can end 102-4.

If a target device is authenticated (Y from 102-3), a configurator and target device can execute one or more wireless positioning operations 102-5. Such an action can include any suitable wireless positioning method or protocol that can provide directional information that can be used to determine if the configurator device is pointing at a target device. In some embodiments, a wireless positioning protocol can include, but is not limited to: Wi-Fi channel state information (CSI), W-Fi fine time measurement (FTM), BLE angle-of-arrival (AoA) or angle-of-departure (AoD). In some embodiments, wireless positioning can also determine a distance from one device to the other. Wireless positioning can result in positioning data for a configurator device. If positioning data does not confirm that the configurator is pointing at the target device (N from 102-6) (and/or the target device is too far away), a configuration operation can end 102-4.

If positioning data confirms that the configurator is pointing at the target device (Y from 102-6), a target device can be automatically configured for a user network with user network data stored in the configurator device 102-7. In some embodiments, such an action can include no user input regarding network configuration, including no need for a user to start a bootstrapping operation (e.g., scanning a QR code or detect/generate a near field communication (NFC) value).

In this way, a configurator device can add new wireless devices to a network automatically with security assurance provided by wireless positioning data.

Figure 2:
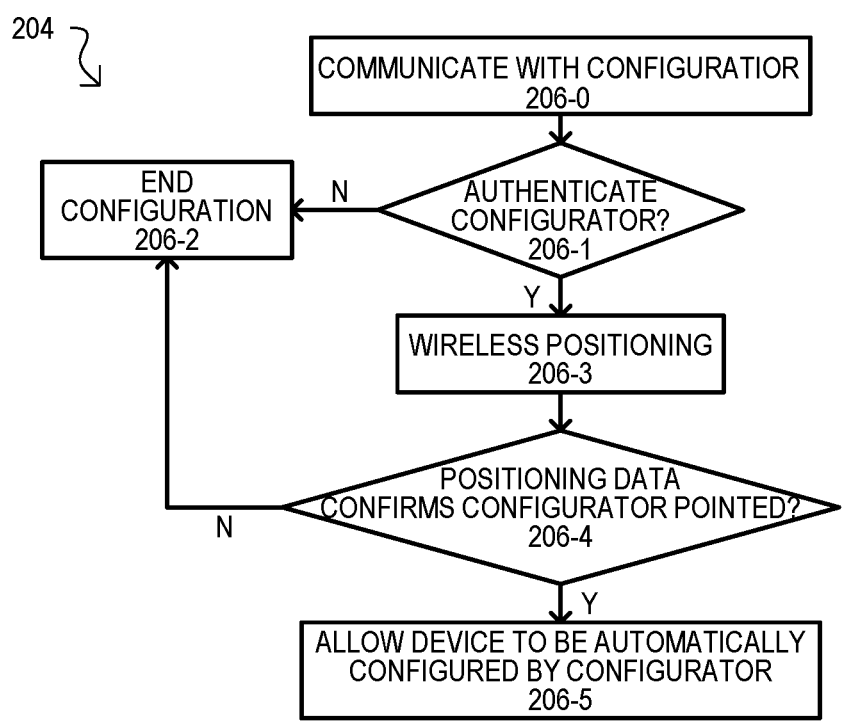
FIG. 2 is a flow diagram of a method for a device to be configured (target device) according to an embodiment.

FIG. 2 is a flow diagram of a method 204 according to an embodiment. A method 204 can be executed by a target device that is to be automatically added to a network by a configuring device. A method 204 can include communicating with a configurator device 206-0. As in the case of FIG. 1, Such an action can include a target device responding to a configurator or vice versa, including generating or responding to a broadcast type transmission. In some embodiments, an action 206-0 can include a target device receiving a configurator device transmission (e.g., advertisement) that includes a digital certificate for the configurator.

A method 204 can include authenticating a configurator 206-1. In some embodiments, such an action can include a target device decrypting a digital certificate or the like, received from the configurator. In some embodiments, such an action can include using a key previously stored in the target device (e.g., by the manufacturer of the target device) or retrieving a key from a manufacturer server. If a configurator cannot be authenticated (N from 206-1), a configuration operation can end 206-2.

If a configurator is authenticated (Y from 206-1), a target device can execute wireless positioning with the configurator 206-3. Such an action can include any suitable wireless positioning method as described herein and equivalents. If positioning data does not confirm that the configurator is pointing at the target device (N from 206-4), a configuration operation can end 206-2.

If positioning data confirms that the configurator is pointing at the target device (Y from 206-5), a target device can allow itself to be automatically configured for a user network by the configurator device 206-05. Such an automatic configuration can include any of those described herein, and equivalents, including the automatic exchange of bootstrapping data followed by a device configuration protocol (DCP). Such a DCP can be according to an existing standard (e.g., Wi-Fi Easy Connect) or a proprietary standard.

In this way, a wireless device can be automatically added to an existing network with security assurance provided by wireless positioning data.

According to embodiments, a wireless positioning technique can be used to detect if one device points to another device. This can include determining a shortest LOS between two devices. Based on such a determination, the two devices can enter an automatic configuration method to add a device to an existing network with little or no input from a user. As noted herein, wireless positioning techniques can include, but are not limited to: Wi-Fi CSI, Wi-Fi FTM, BLE AoA and BLE AoD. In some embodiments, such a method can enable the fast, simple and secure addition of Internet-of-Things (IoT) devices to a user network.

According to embodiments, a user can point a configurator at a target device for configuration. A configurator can be any suitable wireless device that can be pointed at a target device, including but not limited to: a smart phone, remote control, tablet device, or wearable electronic device. In some embodiments, a target device can determine if a configurator is pointing at it, and run a configuration service discovery protocol. In such an arrangement, other nearby wireless devices will not interact with the configurator, as they are not the devices being pointed at. In some embodiments, in addition to determining a pointing direction, a wireless protocol can determine whether the two devices are within a predetermined distance from one another (e.g., do not exceed a maximum range) before allowing automatic configuration to continue.

One device (i.e., a target device or configurator) can detect a service discovery request from the other device (i.e., configurator or target device), and then proceed with device attestation, bootstrapping, authentication and configuration protocols. If every step is okay, the target device can be connected to a network without any user input. In some embodiments, a configurator and target device can include embedded certificates in their wireless communications to ensure such protocols are not executed with unintended (e.g., rogue) devices in the vicinity.

FIGS. 3A to 3D are diagrams of operations of a system 308 and corresponding devices according to embodiments. A system 308 can include a target device 310, a configurator 312 and a server 314. A target device 310 and configurator 312 can take the form of any of those described herein, or an equivalent.

Figure 3A:
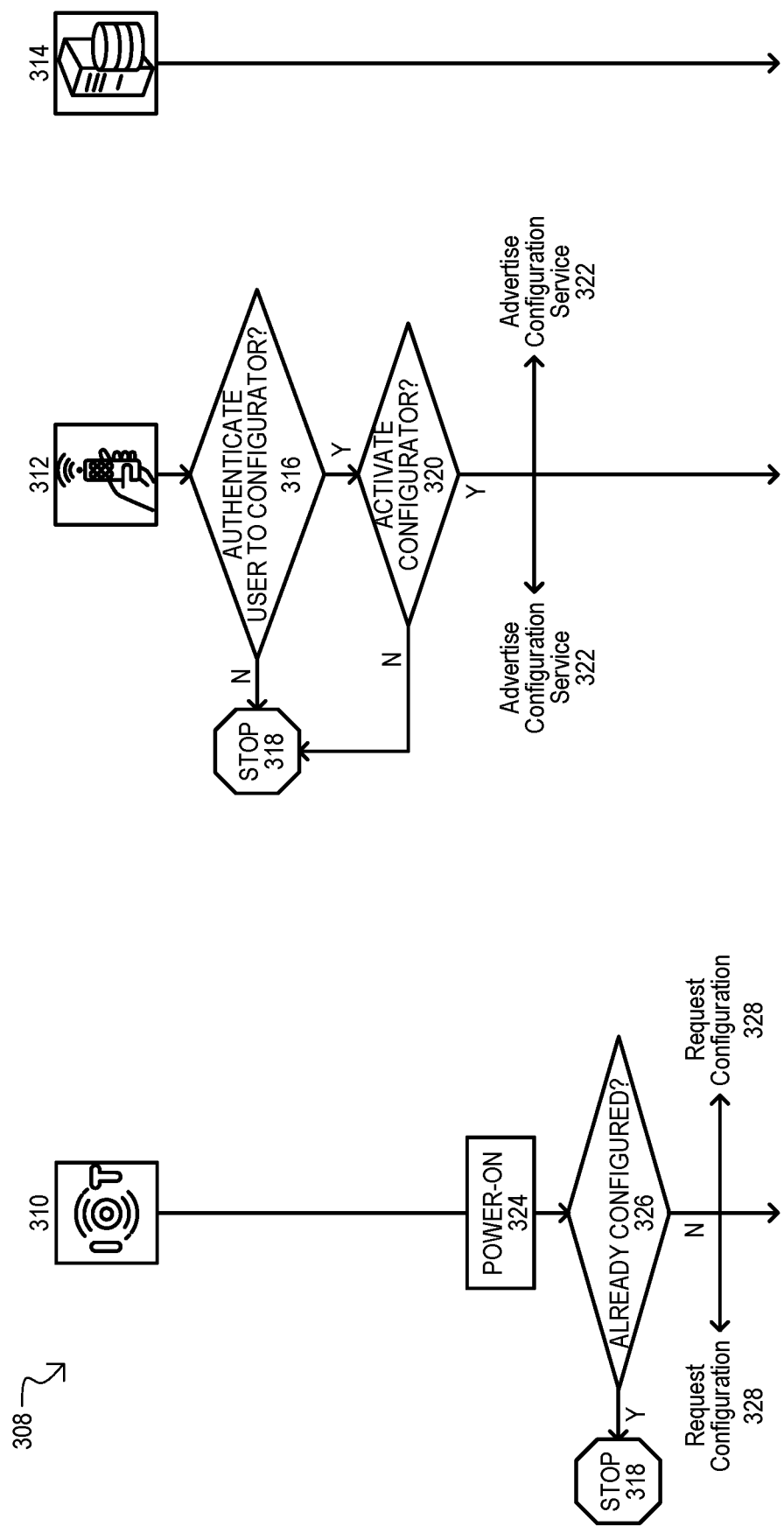
FIGS. 3A to 3D are diagrams showing configuration operations according to an embodiment.

Referring to FIG. 3A, a configurator 312 can store information to enable a target device to be added to an existing network. Such information can include but is not limited to: networking information (e.g., extended service set identification, ESSID or Wi-Fi password); user account information (e.g., account url, user name, password for accessing devices of the network); and user notification data (e.g., cell phone number, email address).

A configurator 312 can authenticate a user to the configurator 316. Such an action can include any suitable user authentication processes, including but not limited to biometrics, passwords, PINs, location (e.g., GPS), or physical identification item (e.g., magnetic strip, NFC devices), and can include two-factor authentication. If a user cannot be authenticated to the configurator (N from 316), a configuration operation can end 318.

If a user is authenticated to a configurator (Y from 316), the configurator can be activated 320 to execute an automatic configuration operation. Such an action can include any of those described herein, or equivalents. If a configurator is activated (Y from 320), a configurator can advertise or otherwise indicate the availability of a configuration service 322. Such an action can include a configurator transmitting a wireless message according to one or more protocols, including periodically. Such an advertisement can include, but is not limited to, a Wi-Fi direct (P2P) protocol, Wi-Fi Aware (neighbor aware networking, NAN) and/or transmission on a BLE advertisement channel. A configurator can include an embedded digital certificate in an advertisement or in such initial protocol communications. Such an embedded configurator certificate can enable a target device to authenticate the configurator. In some embodiments, a configurator certificate can include a configurator public key, a manufacturer's public key, a manufacturer identification (e.g., manufacturer's name and/or url) signed by a manufacturer's private key.

Upon powering on 324, a target device 310 can determine if it has already been configured 326. If the target device is already configured (Y from 326), the configuration operation can end 318. That is, if a target device 310 is already configured for a network, it will not automatically seek configuration for another network. In some embodiments, a target device 310 can be returned to an unconfigured state from a configured state through a reset operation or the like. Such an action can include following predetermined instructions (e.g., a "factory" reset). If the target device is not already configured (N from 326), the target device can seek configuration 328. Such an action can include monitoring wireless communications for one or more configuration services indicated by a configurator.

Figure 3B:
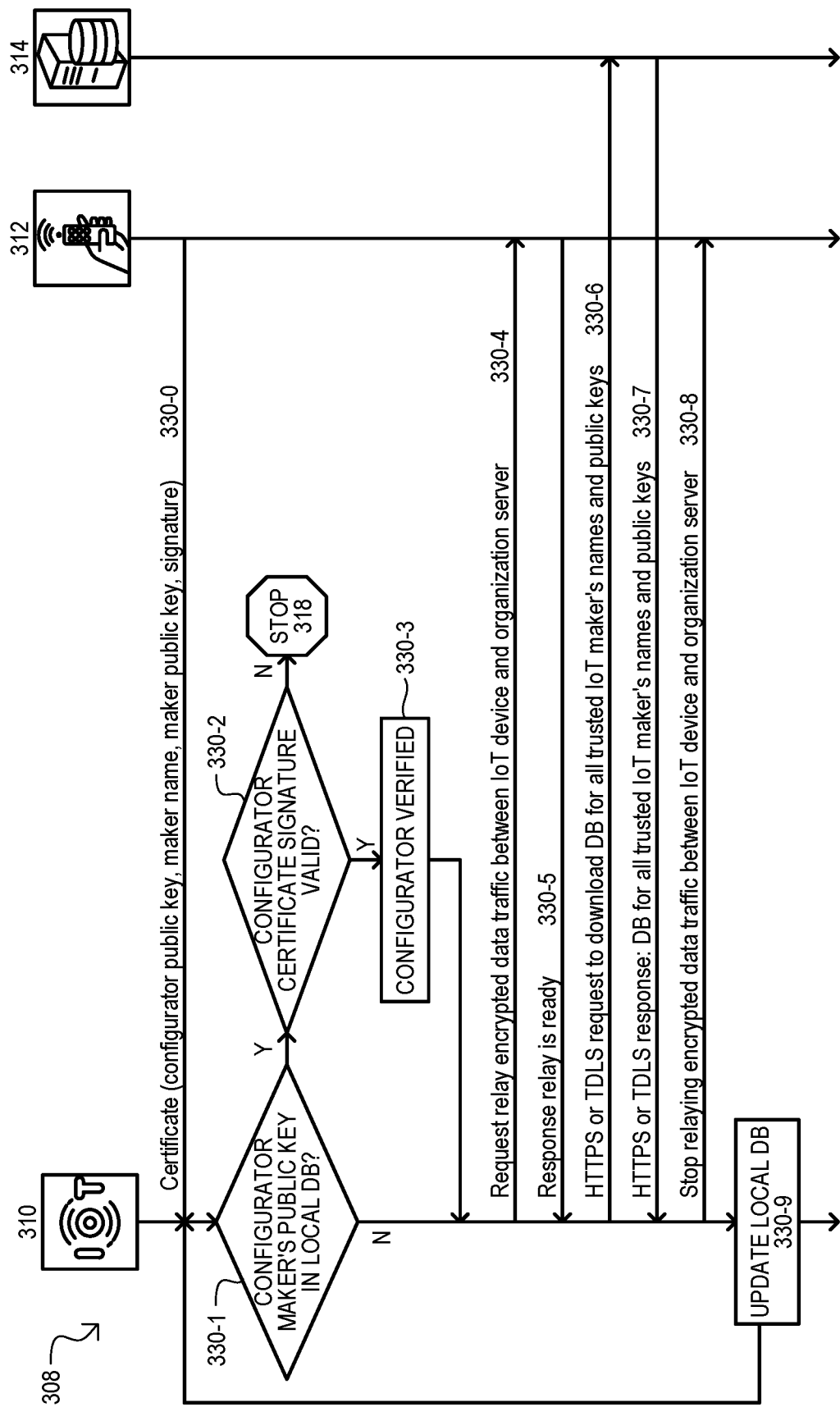

Referring to FIG. 3B, a target device 310 can discover a configurator certificate 330-0 included within a configurator's communication (e.g., advertisement). A target device 310 can authenticate a configurator certificate either offline (e.g., with its own local database) or online (e.g., through a secure connection using the configurator). According to embodiments, upon detecting a configurator certificate, a target device can determine if it stores a public key for the configurator. Such an action can include a target device using configurator certificate information, such as a manufacturer's name or other id, to access a stored public key corresponding to the configurator. In some embodiments, a target device can have its own database that stores public keys for multiple manufacturers. In some embodiments, an industrial organization (e.g., target device manufacturer) can collect public keys from trusted manufacturers (e.g., configurator manufacturers) and store them in a nonvolatile memory of a target device.

If a target device stores a configurator public key (Y from 330-1), a target device can attempt to validate the configurator certificate 330-2. If a configurator public key is not stored by the target device (N from 330-1), a target device 310 can request that the configurator 312 relay encrypted data between the target device and a server known to the target device 330-4. If a configurator 312 is capable of providing such a relay, the configurator can respond when such a relay is ready 330-5. A target device can utilize the secure, encrypted relay through the configurator to request a database of data for trusted manufacturers (e.g., public keys, manufacturer names) 330-6. In some embodiments, in response to such a request a configurator can relay an end-to-end HTTPS connection (or any other suitable connection, such as tunneled direction link setup, TDLS) between the target device and the server.

A server can respond by transmitting a database over the relay to the target device 330-7. Upon receiving such a database, a target device can indicate to the configurator that the relay should be ended 330-8. A target device 310 can update its local database 330-9 and try to validate the configurator certificate. If a configurator certificate can be validated (Y from 316-2), a configurator can be validated and a configuration operation can continue (e.g., proceed to FIG. 3C). If a configurator certificate cannot be validated (N from 316-2), a configuration operation can end 318.

Figure 3C:
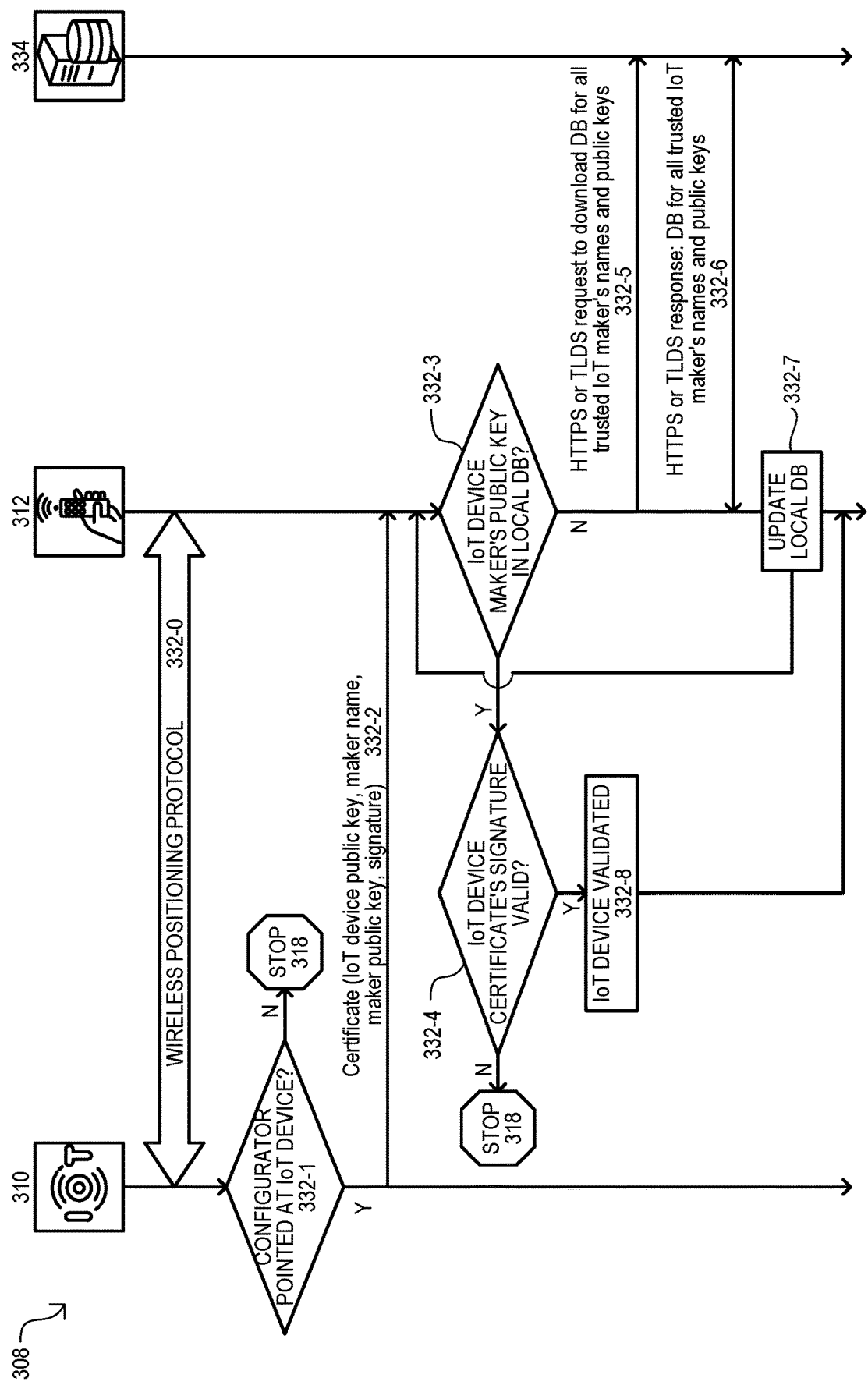

Referring to FIG. 3C, with a configurator certificate validated, a target device 310 can initiate a wireless positioning protocol 332-0. A wireless positioning protocol 332-0 can enable a target device to detect a configurator position/orientation. A wireless provisioning protocol can take any suitable form, and can include the wireless transmission of signals between a target device and configurator to generate positioning data and/or a positioning result. According to embodiments, wireless positioning measurements can be carried out by a proprietary FTM protocol with CSI support, and/or with BLE AoA/AoD measurements. Such Wi-Fi and BLE measurements can be taken together in the case of devices that can operate with both Wi-Fi and BLE protocols (e.g., can include a "combo" chip having Bluetooth and Wi-Fi compatible wireless circuits).

In some embodiments, to ensure authenticity in the wireless positioning protocol, a target device 310 can generate a nonce or similar value. Such a nonce value can be included in data initially transmitted to a configurator. Such initial data can be encrypted with a configurator public key. Both a target device and configurator can use the nonce value to protect subsequently exchanged position measurement data. As but one of many possible examples, a nonce can be used to generate keyed hash values of the measurement data.

According to embodiments, a target device can analyze positioning data to determine if a configurator is pointed at the target device 332-1. Such an action can vary according to the wireless positioning protocol used. In some embodiments, CSI data can be examined to determine if every receiving antenna of the target device has essentially a same AoD from all transmitting antennas of the configurator. In addition, a spectrum of received signals can be analyzed to determine if they show characteristics of a LOS channel. Still further, in some embodiments, a distance measurement to a configurator can also be used to establish that the configurator is pointing at the target device. If a configurator is determined to be not pointing at the target device (N from 332-1), a configuration operation can end 318.

If a configurator is determined to be pointing at the target device (Y from 332-1), the target device can continue the service discovery protocol with the configurator. A target device 310 can transmit its own embedded security certificate 332-2. Such a security certificate can take a form suitable to the service discovery protocol being used, and can include, but is not limited to, a target device public key, a target device manufacturer's name, device manufacturer's public key and digital signature.

Upon receiving the target device certificate, a configurator can attempt to verify the certificate. In some embodiments, such a verification operation can include actions like those described for the target device in FIG. 3B. In particular, a configurator can determine if the target device public key is stored locally (332-3). If it is not stored locally (N from 332-3), a configurator can establish a secure connection with a known server 334, and request a database for all trusted target device manufacturers 332-5. Such a secure connection can be according to any suitable protocol including HTTP or TLDS, as but two examples. Upon receiving the database 332-6, a configurator can update its local database 332-7 and then attempt to validate the target device certificate again. If the target device certificate cannot be authenticated by the configurator (N from 332-4), a configuration operation can end 318. If the target device certificate can be authenticated by the configurator (Y from 332-4), a configuration operation can continue.

Figure 3D:
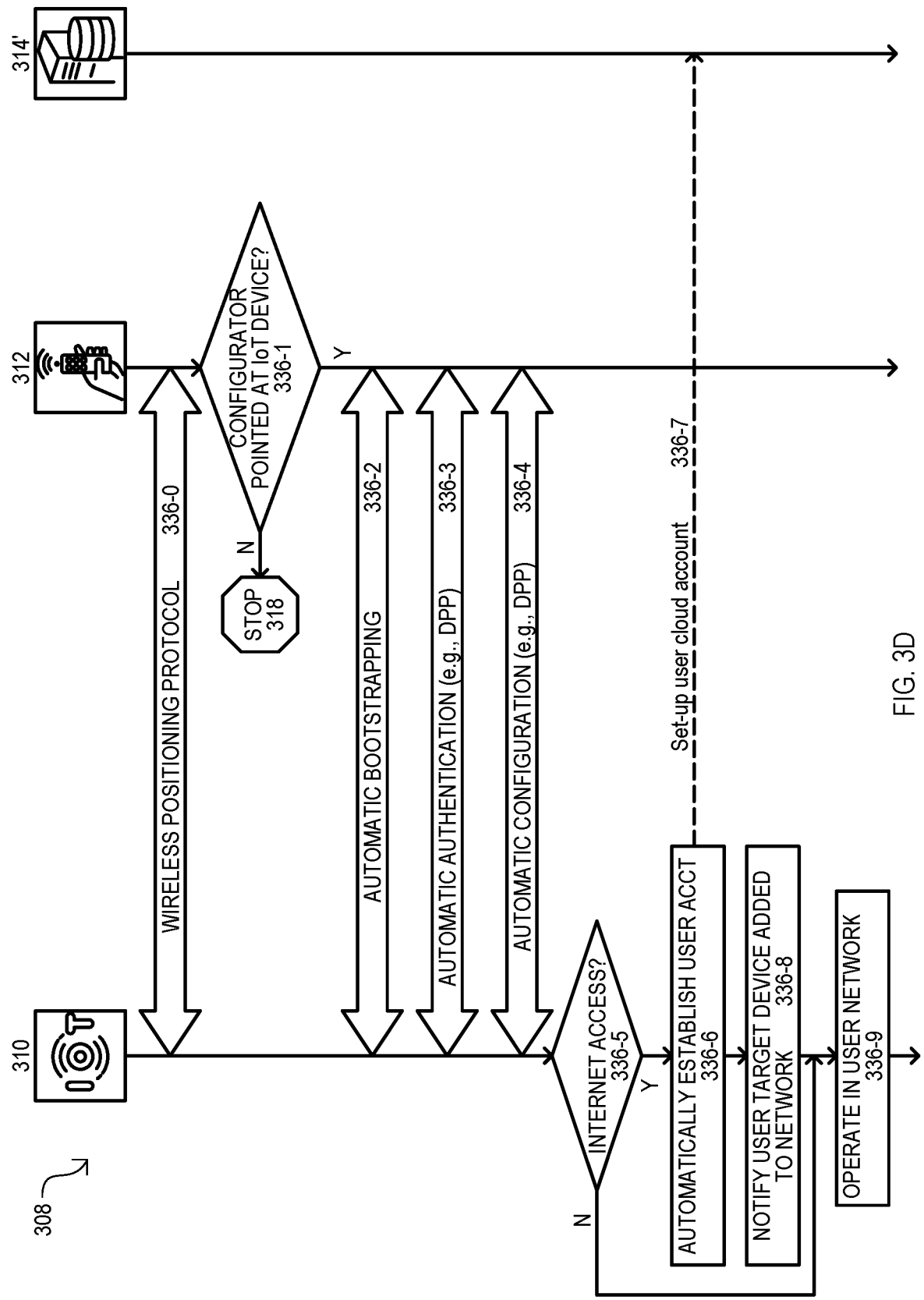

Referring to FIG. 3D, after a target device certificate has been authenticated by a configurator, the configurator 312 can execute a wireless positioning protocol 336-0 with the target device 310. A wireless positioning protocol 336-0 can take the form of any of those described herein, or equivalents, and can provide position data for configurator 312. A configurator can analyze position data to determine if it is pointed at the target device 336-1. Such an action can include determining if the target device is within a predetermined (e.g., minimum) distance from the configurator. If the configurator determines it is not pointed at the target device (or too far away) (N from 336-1), the configuration operation can end 318.

If the configurator determines it is pointed at the target device (Y from 336-1), the configuration operation proceed to automatically configure the target device 310 to the user network. A target device and configurator can execute an automatic bootstrapping operation 336-2. Such an action can include a target device and configurator exchanging initial information required for communicate and execute authentication and configuration operations. In some embodiments, such an action can include a target device transmitting bootstrapping data equivalent to that generated from a device configuration protocol (DCP), such as that Wi-Fi Easy Connect. As but one example, a target device can provide data that is the same, or equivalent to, that generated from a QR code, active or passive near field communication (NFC) device/tag, or text strings in a conventional DCP. It is understood that such automatic bootstrapping 336-2 can include no input from a user, being executed automatically once a target device and/or configurator have established the configurator is pointed at the desired target device.

Following automatic bootstrapping, a target device and configurator can execute an automatic authentication operation 336-3 and automatic configuration operation 336-4. In some embodiments, such actions can follow an existing DCP, including but not limited Wi-Fi Easy Connect. However, the use of proprietary protocols is anticipated. In some embodiments, automatic authentication 336-3 can utilize a public key infrastructure. Automatic configuration 336-4 can include a configurator securely providing network data that enables a target device 310 to automatically join a user network. Network data can include, but is not limited to, a network id (e.g., BSSID), network password, user id, user password, and user contact information (e.g., email, text number). It is understood that such automatic authentication 336-3 and configuration 336-4 can include no input from a user, being executed automatically between a target device and configurator.

Upon completion of an automatic configuration operation 336-4, a target device 310 can connect to a network automatically.

Referring still to FIG. 3D, if a target device 310 has permission to access the Internet, a target device can automatically establish a user account 336-6. Such an action can include adding the target device to an existing user account, or if there is no existing user account, create an appropriate user account. In some embodiments, a target device can contact a server 314' to create or update a "cloud" account for a user 336-7. A target device can notify a user that it has been added to the user's network 336-8. Such an action can include using user contact information to send an electronic message to the user. Such a notification can take any suitable form. In some embodiments, a notification may contain any of: a url pointing to the user's general account, a url pointing to the user's specific account, or a url pointing to a location at which a target device's controlling application can be accessed or downloaded. If a target device does not have access to the Internet (N from 335-6) or notifications have been generated, the target device can operate in the user network 336-9 as designed.

In this way, new devices can be added to a network without any user input. A user can simply point a configurator device at a target device, and that device will be automatically added to the network.

Figure 4:
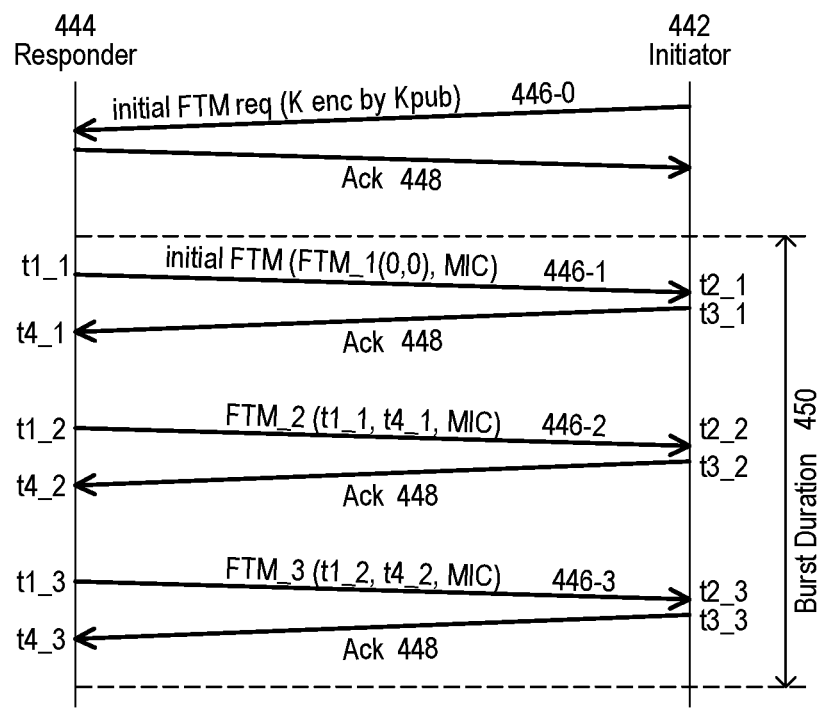
FIG. 4 is a flow diagram showing the transmission of wireless positioning data according to embodiments.

According to embodiments, a configurator and target device can execute a wireless positioning protocol that can generate and transmit position data in a secure fashion. While any suitable wireless positioning protocol can be used, FIG. 4 shows a wireless positioning protocol 440 according to an embodiment. A protocol 440 can include communications between an initiator 442 and a responder 444. An initiator 442 can be a target device (e.g., FIG. 3C, 332-0) or a configurator (e.g., FIG. 3D, 336-0). An initiator 444 can store a public key for a responding device (e.g., from an embedded certificate in a configurator advertisement). An initiator 442 can issue a request to start a wireless positioning protocol 446-0. Such a request can be encrypted with a public key for the responder 444, and can include a nonce, or other generated value. If a responder can execute the wireless positioning protocol it can respond with an acknowledgement 448.

Following a predetermined delay, at a time t1_1, a responder can issue a message that includes an initial set of measurements 446-1. Such a message can be protected with a value received from the initiator, such as a nonce received with the initial request 446-0. Data included in measurement messages can include, but is not limited to any of: time values (time of departure/arrival), power values (received power, transmitted power), signal angle with respect to antennas (angles of arrival/departure) and channel state information (CSI), including but not limited to amplitude and phase. In response to receiving the measurement message, an initiator 442 can respond with an acknowledgement 448. Following the initial measurement message 446-1, a sequence of time difference measurement messages 446-2/3 can be transmitted. Such messages can include measurements taken at a time of departure (e.g., t1_1) and a time of arrival (t4_1).

As noted, measurement messages (446-1/2/3) can be protected with values sent in an initial request 446-0, such as a nonce. In some embodiments, measurement messages (446-1/2/3) can be protected by message integrity check (MIC) framework that uses a nonce value as a key. In some embodiments, a MIC can be generated by a predetermined function (e.g., hash function) operating with the nonce over addresses and a payload of a message. However, alternate embodiments can include any other suitable method of ensuring the integrity of the messages. Measurement messages (446-1/2/3) can be issued in a burst over a burst duration 450. While FIG. 4 shows a set of three measurement messages, embodiments anticipate larger numbers of measurements per burst.

In this way, devices relay wireless measurement that are protected with a value (e.g., nonce) exchanged in an initial secure communication.

According to embodiments, a target device and/or configurator can include multiple antennas for detecting the orientation of one device with respect to the other. In some embodiments, measurement data can include amplitude and/or phase values over a spectrum to enable determination of LOS between the two devices.

Figure 5A:
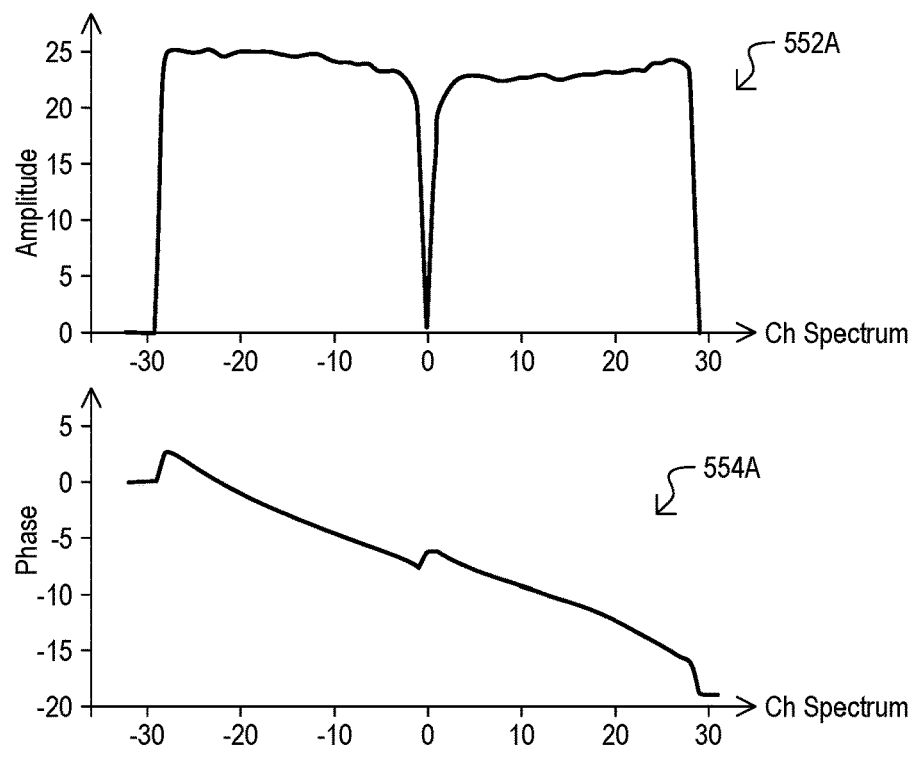
FIGS. 5A and 5B are graphs of a wireless channel response comparing devices having a line of sight, and devices having no line of sight.
Figure 5B:
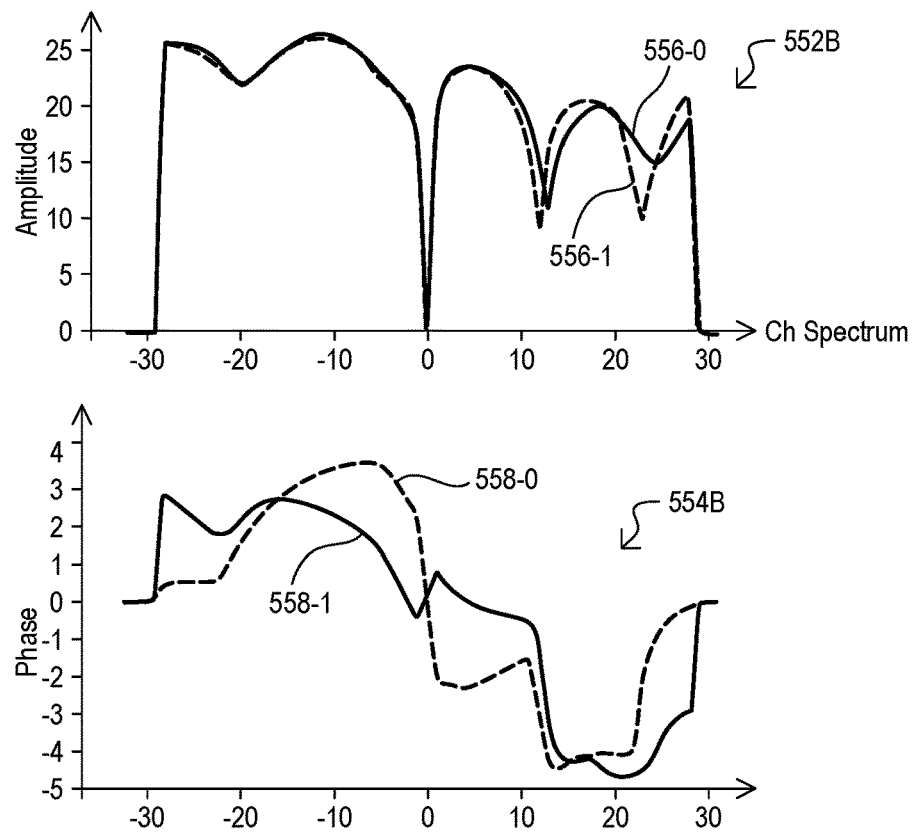

Referring to FIGS. 5A and 5B, when a device with multiple antennas (e.g., a target device) is pointed at by another device with multiple antennas (e.g., configurator), and the distance is relative short, every receiving antenna should have same or similar AoD from each transmitting antenna (although different receiving antennas may detect different AoD from transmitting antennas). In such a case, a channel spectrum (e.g., amplitude and/or phase) can have a near ideal "LOS" characteristics. FIG. 5A shows near ideal LOS characteristics, including a graph of amplitude versus channel spectrum 552A as well as a graph of phase versus channel spectrum 554A. It is understood that graphs 552A/554A represent multiple waveforms corresponding to different antennas, but appear as one waveform as they essentially overlap one another. In contrast, FIG. 5B shows results for a no-LOS (NLOS) case. A graph of amplitude versus channel spectrum 552B shows a waveform for one antenna 556-0 varying from that of another antenna 556-1. Similarly, a graph of phase versus channel spectrum 554B shows a waveform for one antenna 558-0 varying from that of another antenna 558-1. Measurement data reflecting such amplitude and/or phase difference (or lack thereof) can be used by a target device and/or configurator to indicate LOS or NLOS, and thus confirm whether the desired target device for configuration has been detected.

It is understood that FIGS. 5A and 5B are provided by way of example, with differences in antenna data varying according to protocol and/or environment. Operations according to embodiments can select particular portions of a spectrum for evaluation. Further, in some embodiments such measurements can be taken for more than one protocol (e.g., Wi-Fi and BLE).

Figure 6A:
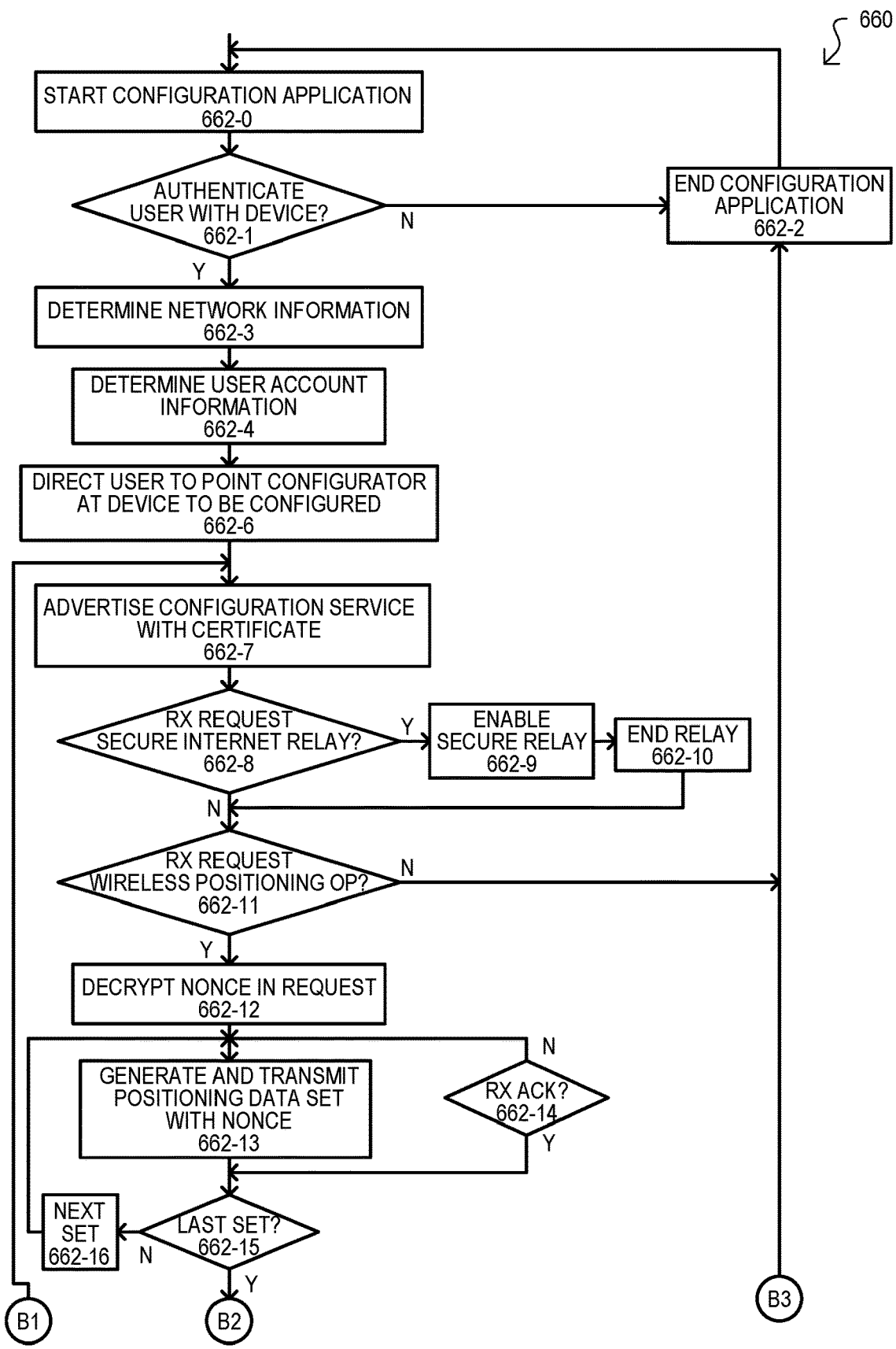
FIGS. 6A and 6B are a flow diagram of a method for a configurator according to another embodiment.
Figure 6B:
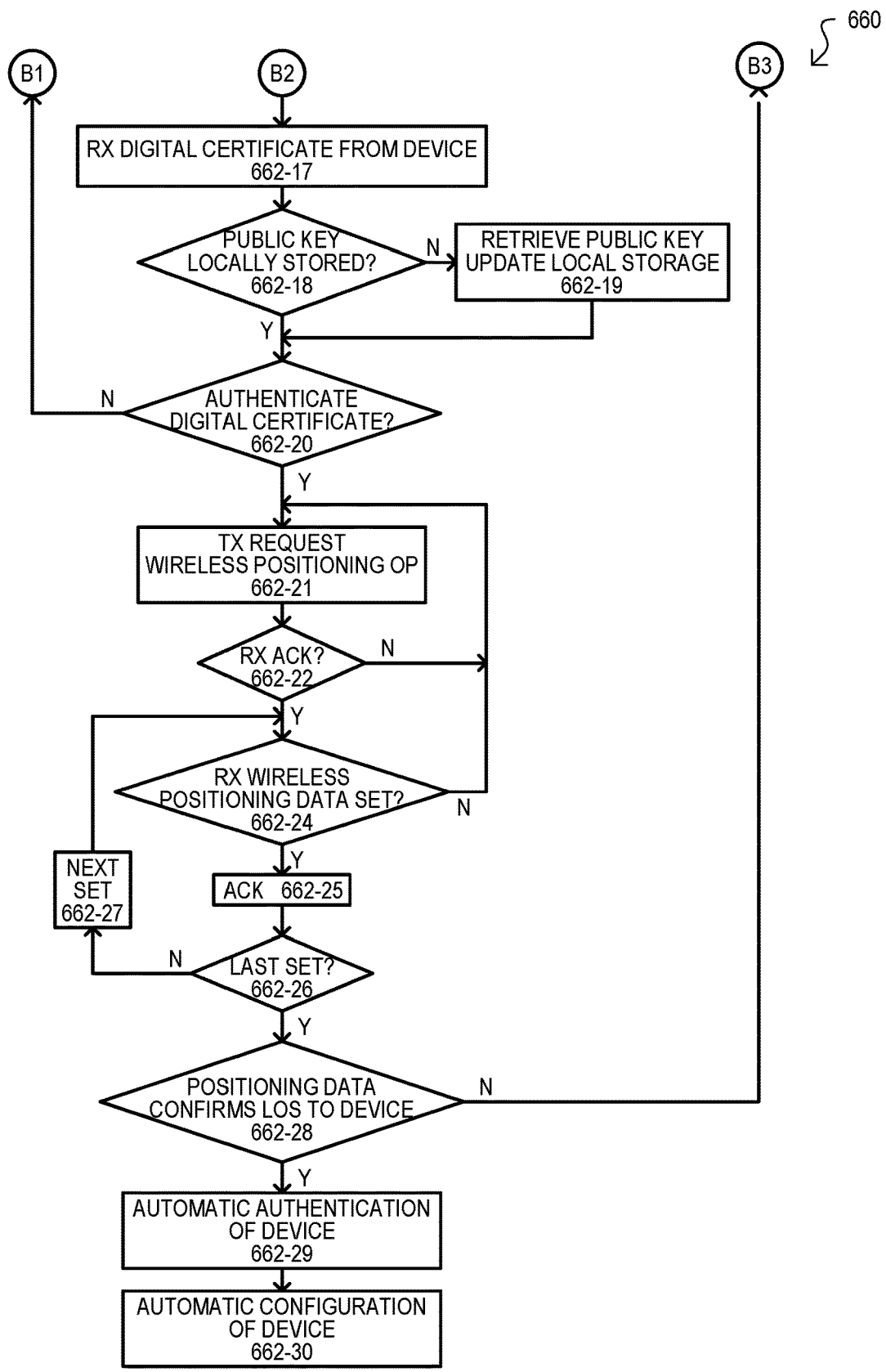

Referring to FIGS. 6A and 6B, a configurator method 660 according to another embodiment is shown in a flow diagram. It is understood that FIG. 6A connects to FIG. 6B at location labeled B1, B2 and B3.

Referring to FIG. 6A, a method 660 can include starting a configuration application 662-0. Such an operation can include any suitable action including but not limited to: powering-on or resetting a configurator device, or selecting a function on a configurator device, such as activating a particular input, including starting a configuration application resident on a configurator. Such a configuration application can include instructions executable by one or processors of a configurator device. Such instructions can be stored in nonvolatile or volatile memory of a configurator.

A user can be authenticated to a configurator 662-1. Such an action can include any suitable user authentication, including but not limited to: a password (including PIN), biometrics (e.g., fingerprint, face recognition), or physical key (e.g., NFC tag, magnetic strip). If a user cannot be authenticated (N from 662-1), a method 600 can end the configuration application 662-2.

A method 660 can determine network information 662-3. Such an action can include local and/or remote access to secure network information. In some embodiments, a configurator can include a secure local store (e.g., nonvolatile memory) that can store information needed to enable a target device to be added to a network. In addition or alternatively, a configurator device can access a remote source (e.g., server) to securely download network information. In other embodiments, a user can enter network information. Network information can include, but is not limited to, a network identification value (e.g., BSSID), identification of a master device of a network (e.g., master node in piconet), network password or other security information.

A method 660 can determine user account information 662-4. Such an action can include secure or remote options. That is, user account information can be stored in a secure memory of a configurator or can be accessed from another device via a secure connection. User account information can include information related to a user that controls a network, and can include, but is not limited to: user contact information (e.g., email address, user cell phone number), a url or other Internet accessible location associated with a user, a user identification value (e.g., email address, user id), or a link or other connection to a user application that can track and/or control devices included in a user network.

A method 660 can direct a user to point a configurator at a target device 662-6. Such an action can include any suitable direction, including but not limited to: a display generated indication (e.g., arrow), a light or other indicator indicating the pointing direction, an indicator on a body of a configurator (e.g., painted/embossed arrow, decal), written directions included with a configurator and/or an audio indication.

A method 660 can advertise a configuration service with a digital certificate 662-7. Such an action can include any suitable wireless transmission that can be detected by a target device. In some embodiments, such an action can include transmitting one or more predetermined messages on a predetermined set or range of frequencies (e.g., advertising channel) and/or a transmission that can self-identify itself as providing a configuration service (e.g., broadcast address or custom address). A digital certificate can enable a configurator to be authenticated. In some embodiments, a digital certificate can identify the configurator to enable a target device to authenticate a configurator and/or configuration service. In some embodiments, a digital certificate can operate with a public key infrastructure and certification authorities. According to embodiments, an advertisement for configuration service can be periodically repeated.

A method 660 can include monitoring for a request for a secure Internet relay 662-8. Such an action can result from a target device seeking Internet access to retrieve data for authenticating the configurator, and assumes the configurator is capable of providing such access. If such a request is made (Y from 662-8), a configurator can enable a secure relay 662-9. Such an action can include, but is not limited to, enabling an end-to-end an HTTP or TDLS connection between the target device and another device. A relay can end 662-10. In some embodiments, a secure relay provided by a configurator can end by request from a target device and/or a timeout condition. It is understood that data transmitted in such relay is secure from the configurator.

A method 660 can monitor for a request from a target device to start a wireless positioning operation 662-11. Such an action can include receiving a wireless request according to a predetermined protocol. In some embodiments, such a request can follow security protocols included in the advertisement for configuration services, including encryption with a predetermined key and method. If such a request is not received (N from 662-11) (including not received within a predetermined time period), a configuration operation can end 662-2.

If a wireless positioning request is received (Y from 662-11), a configurator can decrypt the message to determine a unique value included in the message 662-12 that can be used to ensure the security of wireless positioning data sets. In some embodiments, such a unique value can be a nonce generated by the target device. In some embodiments, if a wireless positioning request is received and successfully decrypted, a configurator can respond with an acknowledgement (ACK).

In response to a wireless positioning request, a method 660 can generate and transmit a wireless positioning data set having integrity secured with the nonce 662-13. Such an action can include providing wireless positioning data according to any of the methods/protocols described herein or equivalents, including but not limited to: timestamped data indicating a time of arrival and/or departure, spectra values (e.g., amplitude and/or frequency) for multiple antennas, AoD values, and AoA values. In some embodiments, a positioning data set can include a MIC generated with a nonce as noted in FIG. 4.

After the transmission of each wireless position data set, a method 660 can wait for an ACK from the target device 662-14. If an ACK is not received (N from 662-14), a method 660 can retransmit the position data. If an ACK is received (Y from 662-14), a method 660 can continue to transmit position data sets (N from 662-15; 662-16), until a last position data set has been sent and acknowledged (Y from 662-15). A number of position data sets can be established according to any suitable method, including but not limited to: as indicated in an advertisement from a configurator (e.g., 662-7), as indicated in request from a target device (e.g., 662-11), or as negotiated between a configurator and target device.

Referring to FIG. 6B, a method 660 can include a configurator receiving a digital certificate from a target device 662-17. Upon receiving a digital certificate, a configurator can determine if a public key is locally stored 662-18. Such an action can include using manufacturer information to look up keys in a secure memory. If key for the target device is not included in a local database (N from 662-18), a configurator can retrieve such a public key and update its local storage 662-19. In some embodiments, such an action can include contacting a known server to download a most current database.

A method 660 can include a configurator attempting to authenticate a digital certificate from a target device 662-20. If a certificate cannot be authenticated (N from 662-20), a configurator can return to advertising a configuration service (662-7). If a target device certificate can be authenticated (Y from 662-20), a configurator can request a wireless positioning operation 662-21. Such an action can include any of those described herein or equivalents. If a configurator does not receive an ACK corresponding to its request (N from 662-22), a configurator can continue to request the wireless positioning operation (and if no acknowledgement is received, can eventually time out and end the configuration operation).

Following the receipt of acknowledgment of its request (Y from 662-22), a configurator can wait to receive sets of wireless positioning data transmitted from a target device. Such wireless positioning data sets can be generated by a target device, and can take the form of any of those described herein, or equivalents. After the reception of each wireless position data set, a method 660 can generate an ACK 662-25 for transmission to the target device. A method 660 can continue to receive position data sets (Y from 662-24, -26, -27), until a last position data set has been received and acknowledged (Y from 662-26).

With all sets (a burst) of data received, a configurator can determine if it is pointing at a target device 662-28. If it determines it is not pointed at a target device (N from 662-28), a configurator can end a configuration operation 662-2. If a configurator determines it is pointed at a target device (Y from 662-28), a configurator can execute an automatic authentication operation 662-29 and an automatic configuration operation 662-30. Such automatic operations can be performed without user input. As noted herein, in some embodiments, such automatic operations can be according to Wi-Fi Easy Connect, but can also be according to a proprietary DCP. Such automatic operations (662-29/30) can start with an automatic bootstrapping as described herein or an equivalent (i.e., a bootstrapping that does not require action from a user).

In this way, once a configurator is authenticated with a user, it can automatically send and receive wireless position data, and determine if it is pointing at a target device. Transmitted wireless encryption data can be verified with a value (e.g., nonce) received from a target device.

Figure 7A:
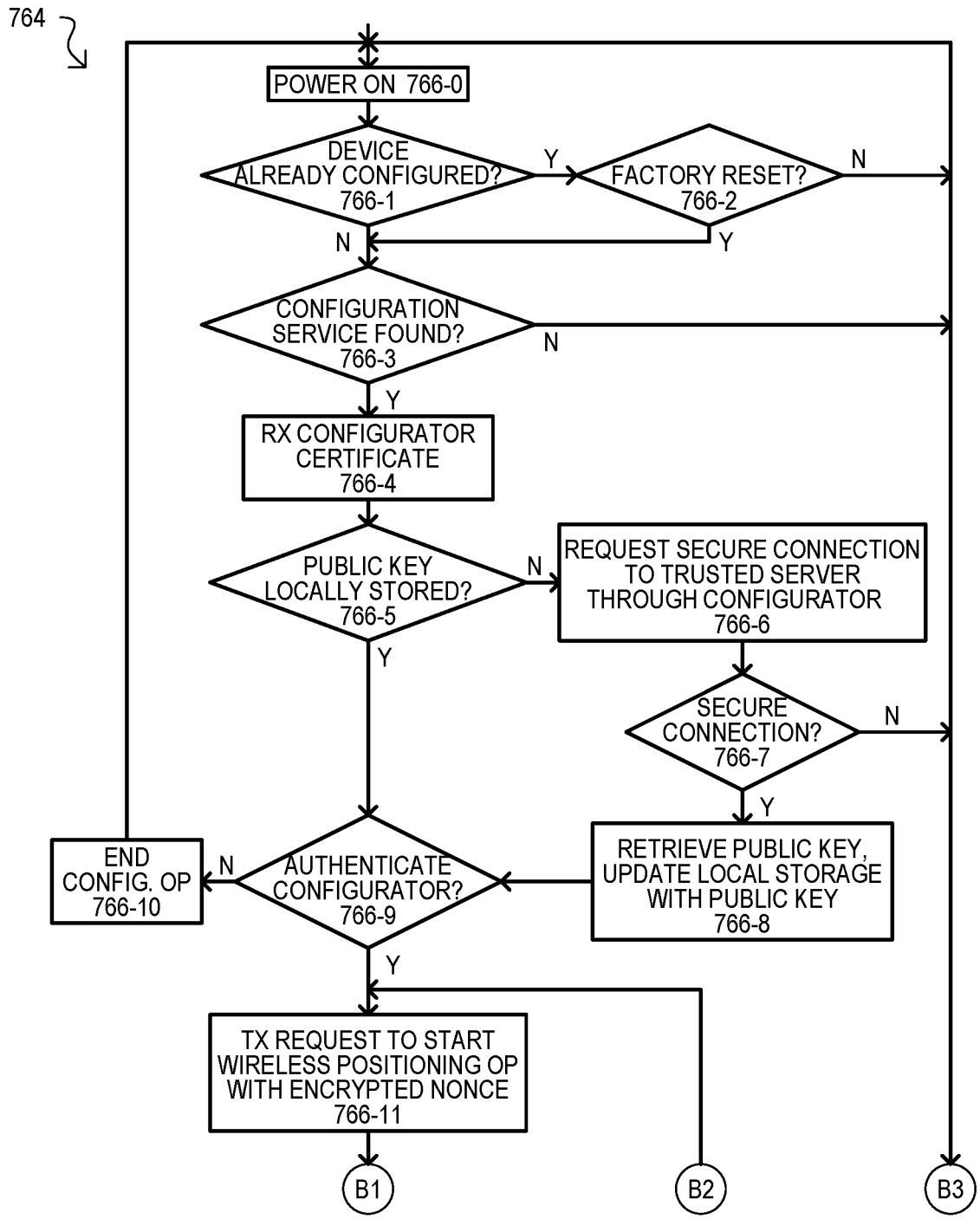
FIGS. 7A to 7C are a flow diagram of a method for a target device according to another embodiment.
Figure 7B:
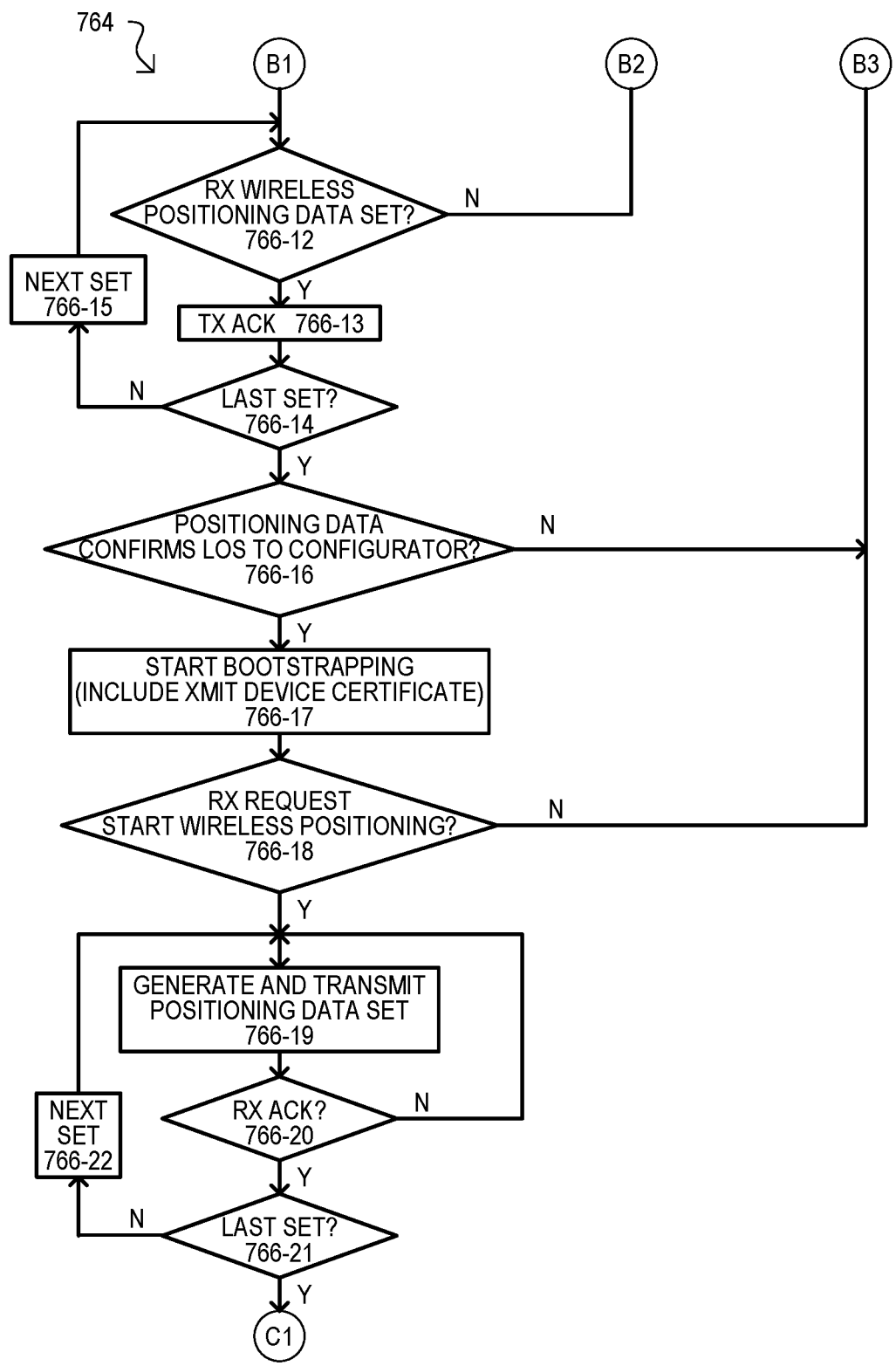
Figure 7C:
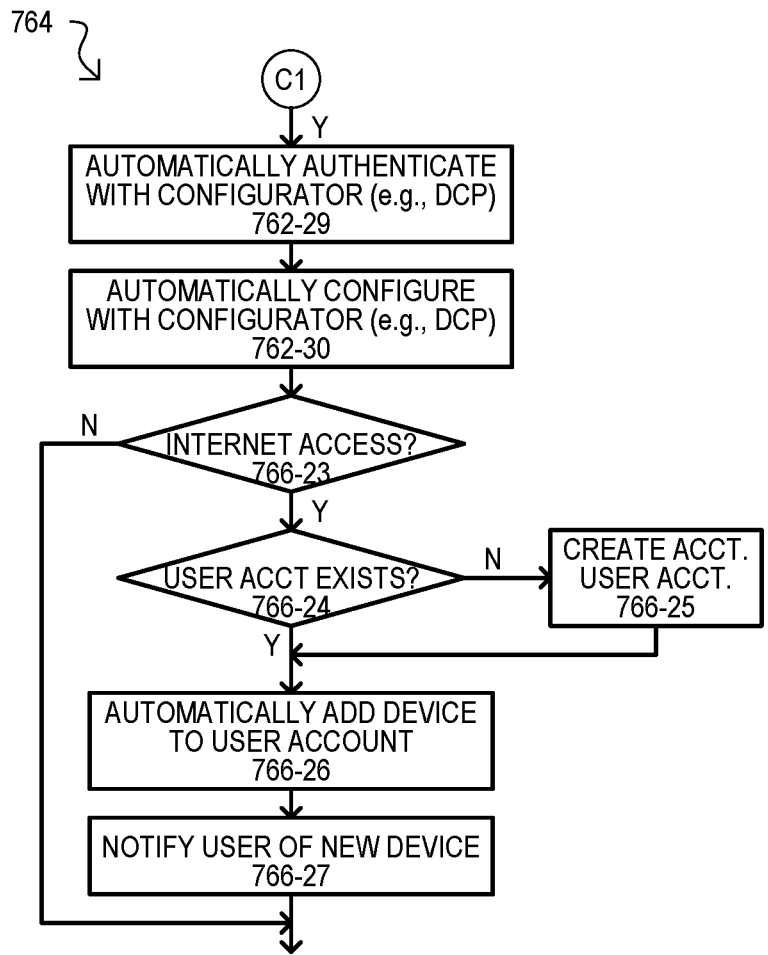

Referring to FIGS. 7A to 7C a target device method 764 according to another embodiment is shown in flow diagrams. It is understood that FIG. 7A connects to FIG. 7B at location labeled B1, B2 and B3, and FIG. 7B connects to FIG. 7C at location labeled C1.

Referring to FIG. 7A, a method 764 can include powering-on a target device 766-0. Upon powering on, if a target device is already configured for a network (Y from 766-1) and the device is not subject to a factory reset (N from 766-2), a configuration operation can end, as the target device has already been configured. If a target device is not already configured (N from 766-1) or has been subject to a factor reset (Y from 766-2), a target device can seek a configuration service 766-3. If a configuration service is not found (N from 766-3), a configuration operation can end.

If a configuration service is found (Y from 766-3), a target device can receive a digital certificate from a configurator (766-4). Such an operation can include receiving an advertisement, or the like, that includes an embedded digital certificate. However, alternate embodiments can include a target device issuing a request for a configuration service. From a digital certificate, a target device can search for a corresponding public key in a local database. If a local public key is not stored (N from (766-5), a target device can request a secure connection to a trusted server through a configurator 766-6. If such a secure connection cannot be provided (N from 766-7), a configuration operation can end. If a secure connection can be provided (Y from 766-7), a target device can retrieve data from a trusted public server through the connection, and update its local storage to include the latest public keys 766-8. Such an action can include storing such data in a secure nonvolatile store of the target device.

If a target device cannot authenticate a configurator with a public key (N from 766-9), a target device can end a configuration operation 766-10. If a target device can authenticate a configurator with a public key (Y from 766-9), a target device can generate a nonce value and transmit such value in an encrypted request to start a wireless positioning operation 766-11. Such a request can take the form of any of those described herein, including but not limited to establishing a burst count and/or burst duration over which sets of measurement data can be received from a configurator by a target device.

Referring to FIG. 7B, following a request to start a wireless positioning operation, a method 764 can include waiting to receive wireless positioning data sets 766-12. If a data set is not received, a target device can return to requesting a wireless positioning operation 766-11. In some embodiments, if no position data sets are received in a predetermined time, a configuration operation can end (e.g., timeout). After receiving a wireless position data set, a method 764 transmit an ACK to a configurator 766-13. A method 764 can continue to receive and acknowledge position data sets (N from 766-14; 766-15), until a last position data set has been sent and acknowledged (Y from 766-14). Such position data sets can be established and take various forms according to embodiments described herein and equivalents, including having MICs generated by a configurator with the nonce from the target device.

After receiving position data sets, a target device can analyze such data and determine if a configurator is pointed at it 766-16. Such analysis can take the form of any of those described herein or equivalents. If a configurator is determined to not point at the target device (N from 766-16), a configuration operation can end.

If a configurator is determined to point at the target device (Y from 766-16), a target device can start a bootstrapping operation, which can include the encrypted transmission of a digital certificate for the target device 766-17. A bootstrapping operation can include those steps necessary for a target device to communicate over the network. A bootstrapping operation can include, but is not limited to, identifying channel/link-layer information and/or the exchange of temporary encryption keys. It is understood that a bootstrapping operation, unlike conventional approaches, can include no action from a user, such as scanning of a bar code or detection using NFC, as but two examples.

In some embodiments, after transmitting its digital certificate to a configurator, if a target device does not receive a request to start a wireless positioning operation (N from 766-18), the configuration can end. If such a request is received (Y from 766-18), a target device can generate and transmit a position data set 766-19. If an ACK for the position data is not received from the configurator, a target device can retransmit the position data. If an ACK is received (Y from 766-20), a method 764 can continue to transmit position data sets (N from 766-21; 766-22), until a last position data set has been sent and acknowledged (Y from 766-21).

Referring to FIG. 7C, after a target device has authenticated the configurator and determined the configurator is pointed at it, a target device can execute an automatic authentication operation 762-29 and an automatic configuration operation 762-30 with a configurator. Such automatic operations can be performed without user input and take the form of any of those described herein and equivalents.

Once a target device has been automatically authenticated and configured, if a target device has Internet access (Y from 766-23) but does not store data for a user account (N from 766-24), a target device can create a user account 766-25. If a user account exists or is created (Y from 766-24, 766-25), a target device can automatically add itself to a user account 766-26. A target device can notify a user that it has been added to a user network 766-27. In some embodiments, any or all of user account creation (766-25), adding to user account (766-26) or user notification (766-27) can utilize information provided in an automatic device configuration action (e.g., 722-30).

In this way, when a target device powers up, it can seek an automatic configuration service. Upon finding such a service a target device can use LOS to ensure a configurator has selected it for configuration.

Figure 8:
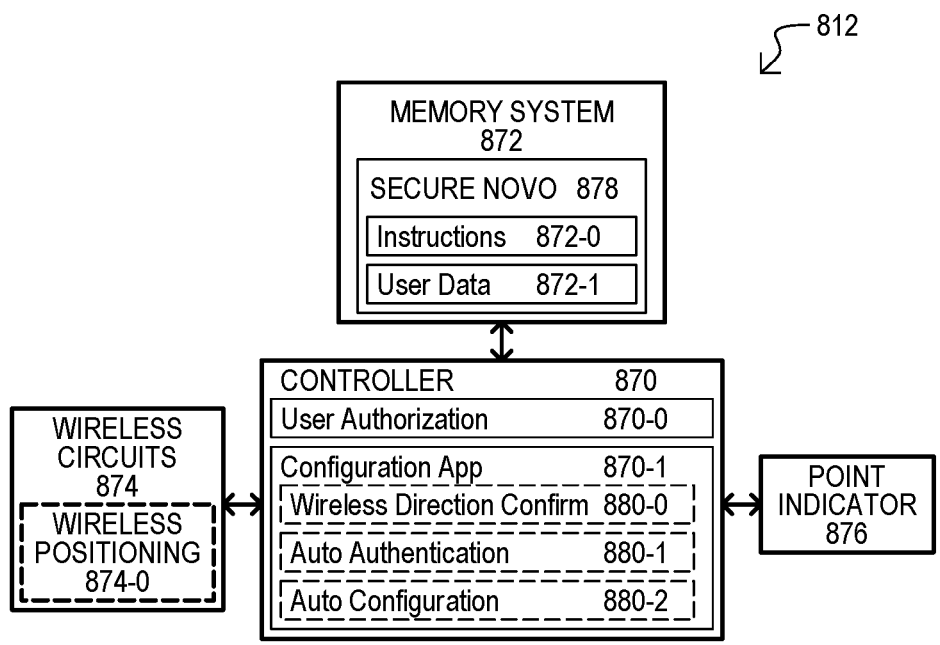
FIG. 8 is a block diagram of a configurator according to an embodiment.

Referring to FIG. 8, a block diagram of a configurator 812 according to an embodiment. A configurator 812 can include controller circuits 870, a memory system 872, wireless circuits 874 and a pointing indicator 876. Controller circuits 870 can include processor and/or logic circuits for executing the various configurator operations descried herein. Controller circuits 870 can include but are not limited to: one or more processors with corresponding memory, custom logic, programmable logic, or combinations thereof. In some embodiments, controller circuits 870 can include processor(s) that execute instructions 872-0 stored in nonvolatile memory 878, which can be, or can include secure regions. Secure regions can be regions accessible only in response to predetermined security procedures.

In the embodiment shown, controller circuits 870 can provide a user authorization function 870-0 and a configuration application 870-1. A user authorization function 870-0 can require a user to authenticate themselves with the configurator 812 or configuration application 870-1. A user authorization function 870-0 can include any personal authorization/authentication actions as described herein, or equivalents. Such personal authorization/authentication actions can utilize features resident on the configurator 812, including but not limited to: biometric readers (e.g., fingerprint readers, cameras), user interfaces (e.g., text/voice entry), other inputs/outputs (IOs) (e.g., NFC readers, magnetic readers, QR code processors).

A configuration application 870-1 can include the various automated configuration features as described herein and equivalents. Such features can include, but are not limited to wireless direction confirmation 880-0, automatic authentication 880-1 and automatic configuration 880-2. Wireless direction confirmation 880-0 can use wireless data to determine if a configurator 812 is pointed at a target device. Following a determination that a configurator 812 is pointed at a target device, automatic authentication 880-1 can authenticate a target device without the need to input security data at the time, including authenticating without user input and/or action. Similarly, following a determination that a configurator 812 is pointed at a target device, automatic configuration 880-2 can configure a target device for a network (i.e., commission the target device) without the need to input network or user data at the time. Automatic authentication 880-1 and/or configuration 880-2 can take the form of any of those described herein or equivalents, including DCP according to a preexisting standard and/or according to a proprietary standard.

A memory system 872 can include any suitable memory for enabling a configurator to execute configuration functions. A memory system 872 can include a secure nonvolatile memory 878 which can store user data 872-1 for configuring a target device. User data 872-1 can include user and/or configuration data as described herein or equivalents, including data for configuring a target device.

Wireless circuits 874 can include circuits for communicating according to one or more wireless standards, including but not limited to one or more IEEE 802.11 wireless standards and/or one or more BT standards (including BLE). Wireless circuits 874 can be configured to execute one or more wireless positioning protocols 874-0, which can take the form of any of those described herein and equivalents. A wireless positioning protocol 874-0 can provide wireless positioning data for a configuration application 870-1. From such data, a wireless direction confirmation function 880-0 can determine whether or not a configurator is pointed at a target device.

A pointing indicator 876 can indicate to a user how to point a configurator at a target device. A pointing indicator 876 can take the form of any of those described herein or equivalents.

Figure 9:
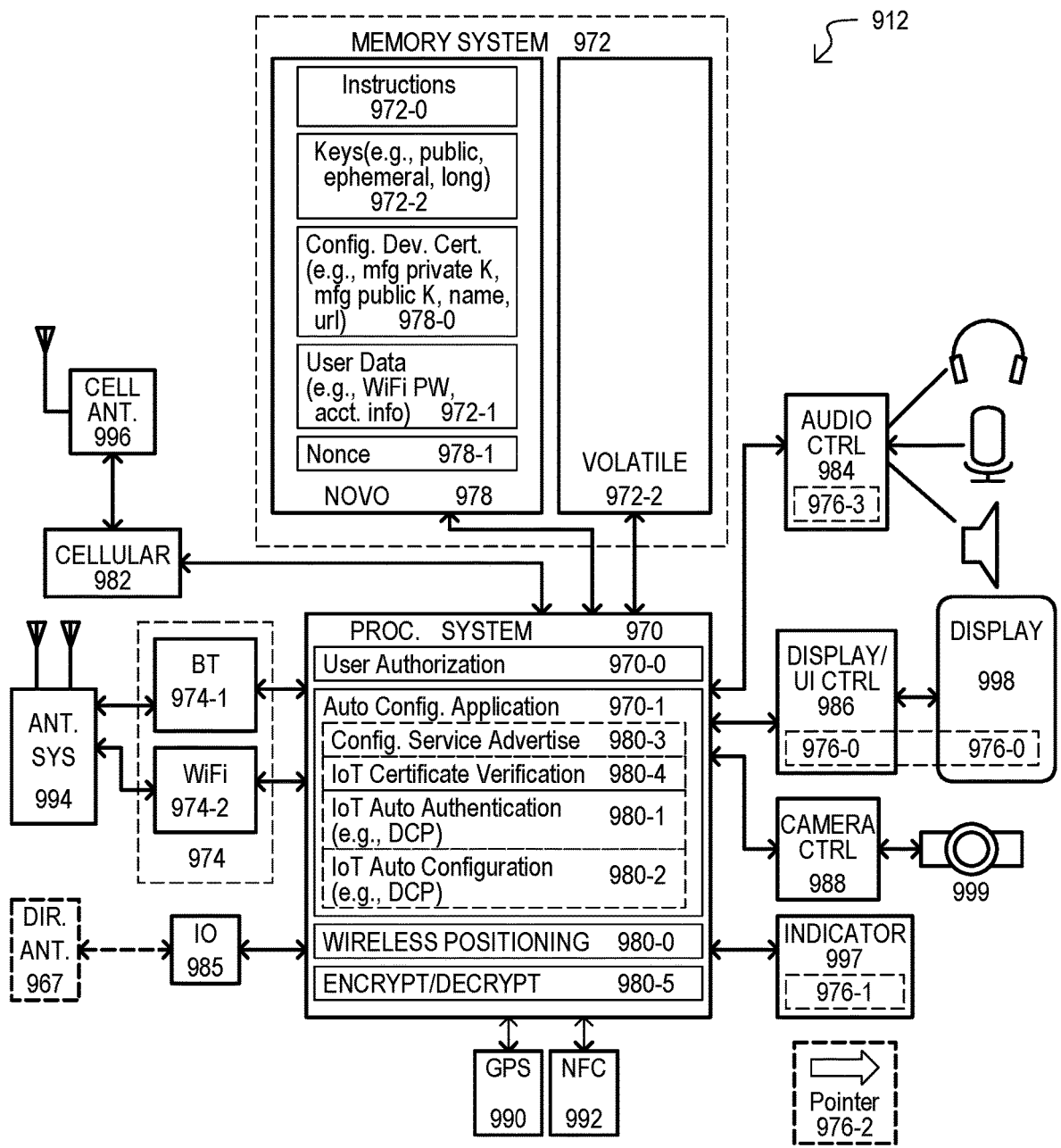
FIG. 9 is a block diagram of a configurator according to another embodiment.

FIG. 9 is a block diagram of a configurator 912 according to another embodiment. A configurator 912 can include a processor system 970, a memory system 972, wireless circuits 974, cellular circuits 982, audio control circuits 984, input/output (IO) circuits, display/user input (UI) control circuits 986, camera control circuits 988, location circuits 990, NFC circuits 992 and one or more indicators 997.

A processor system 954 can include one or more processors that can execute instructions 972-0 stored in memory system 972 to provide various functions noted herein, as well as other functions suitable to the type of device (cell phone communication, execution of other applications etc.). Executed instructions 972-0 can provide functions including but not limited to: user authorization 970-0, an automatic configuration application 970-1, wireless positioning operations 980-0 and encryption and decryption 980-5. User authorization operations 970-0 can include any of those operations described herein and equivalents in which a user authenticates themselves with the configurator 912 or automatic configuration application 970-1. Embodiments anticipate user authorization 970-0 including activation of any of various portions of the configurator 912, including but not limited to: display/UI control circuits 986 (e.g., fingerprint reader, text input for password and/or PIN); camera control circuits 988 (e.g., facial recognition, other biometrics); location circuits 990 (confirm physical location of requesting user); or NFC circuits 992 (detect NFC key of user).

Automatic configuration application 970-1 can include operations as described herein, including automatic authentication/configuration operations 980-0/1 as described herein (e.g., standard or proprietary DCP), but without the need for any user input (e.g., no QR code, no NFC scan, no text input). In some embodiments, automatic configuration application 970-1 can also execute a configuration advertisement function 980-3, which can broadcast a notification of the automatic configuration capabilities of configurator 912, as described herein or equivalents. Such a broadcast can be according to any suitable wireless protocol, including but not limited to any 802.11 wireless standard and/or BT standard. An automatic configuration application 970-1 can also execute a target device certificate verification function 980-4, which can access a secure local public key or a remote public key to verify a digital certificate received from a target device.

Wireless positioning operations 980-0 can receive position data sets from a target device via wireless circuits 974. From such position data, a configurator 912 can determine an orientation of a configurator with respect to the target device. Such operations can occur as described for embodiments herein, and equivalents including but not limited to: CSI, FTM, AoA and AoD. Such data can be generated with wireless data sets generated with any suitable wireless standard, including but not limited to any 802.11 wireless standard and/or BT standard. Encryption/decryption operations 980-5 can encrypt transmissions to a target device, including using a nonce 978-1 received from a target device (e.g., include MIC in wireless data sets). Encryption can also use public keys from a public-private key infrastructure, as well as ephemeral keys (e.g., in bootstrapping operations), and longer term keys (e.g., in automatic authentication and configuration operations). Decryption operations can decrypt messages from a target device, including with private keys (local and/or retrieved), as well as ephemeral keys and longer term keys.

A memory system 972 can include nonvolatile "flash" memory 978 and volatile memory (e.g., DRAM) 972-2. Flash memory 978 can include a secure storage region that can store various values for executing automatic configuration based on direction (e.g., LOS) as described herein or equivalents. Stored values can include, but are not limited to: instructions 972-0 for execution by processor system 970, keys 972-2 (e.g., a target device public key, ephemeral keys, long term keys), a digital certificate for the configurator 978-0, user data (e.g., user network id, network password(s), user account information), and one or more nonce values 978-1 (e.g., generated by a target device and derived by decrypting a target device message).

Wireless circuits 974 can include BT circuits 974-1 and Wi-Fi circuits 974-2. BT circuits 974-1 can be compatible with one or more BT standards. WLAN circuits 974-2 can be compatible with one or more IEEE 80.211 wireless standards. In some embodiments, wireless circuits 974 can be part of a combination integrated circuit device. Wireless circuits 974 can be connected to antenna system 984. Antenna system 984 can include multiple antennas to enable AoA and AoD values to be generated in a wireless positioning operation. Cellular circuits 982 can provide communication functions according to one or more cellular standards and can be connected to a cellular antenna system 996.

IO circuits 985 can include any suitable IO circuits that can enable configurator 912 to communicate with other devices. IO circuits 985 can be wired or wireless. In some embodiments, IO circuits 985 can include one or more serial interfaces. As described herein, in some embodiments a configurator 912 can include a directional antenna or an array of antennas 967. Such antennas 967 can be used in a wireless detection operation. In some embodiments, such antennas 967 can be connected to configurator 912 with IO circuits 985.

Location circuits 990 can determine a location of a configurator 912, and in some embodiments can include GPS circuits. NFC circuits 992 can provide NFC capabilities for the configurator 912. Audio control circuits 984 can provide audio functions for the configurator 912. Display UI control circuit 986 can control a display 998 of the configurator 912, which an also serve as a user input (e.g., a touchscreen). A camera control circuit 988 can control a camera system 999.

According to embodiments, any of various portions of a configurator 912 can provide a pointing indication for a user to indicate how to point the configurator 912 at a target device for automatic configuration. While a pointing indication can take any suitable form, embodiments anticipate any of: a visual pointing indication 976-0 generated on display 998 by display/UI control circuits 986 (e.g., an arrow or other symbol); another type of visual indicator 976-1 (e.g., LED, laser); a physical pointer 972-6 (e.g., a pointer formed on body of configurator, such as with paint, a decal or an embossing); or an audio or tactile indication 976-3 generated by audio control circuits 984 or other circuits (e.g., vibration).

In some embodiments, a processor system 970, memory system 972, and wireless circuits 974 can be formed by a system-on-chip (SoC) type device.

In some embodiments, a configurator 912 can be a handheld electronic device, such as a smartphone, tablet or other similar device. In this way, a configurator device can advertise an automatic configuration operation, and then execute such an operation when an appropriate response is received from a target device and the configurator is pointed at the target device according to a pointing indicator.

Figure 10:
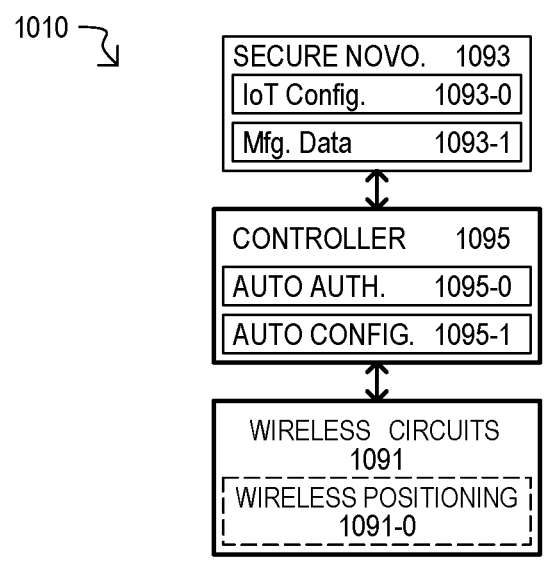
FIG. 10 is a block diagram of a target device according to an embodiment.

FIG. 10 is a block diagram of a target device 1010 according to an embodiment. A target device 1010 can include a controller 1095, a secure nonvolatile memory 1093 and wireless circuits 1091. A controller 1095 can include circuits for executing various functions described herein, and can include one or more processors with corresponding memory, custom logic, programmable logic, or combinations thereof. A controller 1095 can provide an automatic authentication operation 1095-0 and automatic configuration operation 1095-1. Such operations can include those described herein and equivalents, including a proprietary DCP or an existing standard. According to embodiments, such operations can be enabled after a target device 1010 can determined that a configurator is pointed at it based on wireless positioning.

A secure nonvolatile memory 1093 can store various values for operating a target device. According to embodiments, a secure novo memory 1093 can store configuration data 1093-0 and manufacturer installed data 1093-1. Configuration data 1093-0 can be provided from a configurator, or the like, with an automatic configuration operation 1095-1, and can enable a target device to operate in a user network. Manufacturer installed data 1093-1 can be data included in a target device as provided by its manufacturer, and can include a database of values (e.g. keys, ids, internet addresses) of known good configurator manufacturers. A target device 1010 can authenticate a configurator digital certificate with manufacturer installed data 1093-1.

Wireless circuits 1091 can provide wireless communications compatible with one or more wireless standards. Wireless circuits 1091 can enable or provide wireless positioning functions 1091-0. Wireless positioning functions 1091-0 can take the form of any of those described herein and equivalents, and can enable a target device 1010 to determine when a configurator is pointed at it and/or provide position data sets to enable a configurator to determine when it is pointed at the target device 1010. In some embodiments, wireless circuits 1091 can detect an advertisement or similar broadcast from a configurator that can indicate the presence of an automatic network configuration function. In alternate embodiments, a target device 1010 can request automatic configuration.

In some embodiments a target device 1010 can be formed with a single integrated circuit substrate.

In this way, a target device can include a wireless positioning function to enable itself to be automatic configured for a network by a configurator device once the configurator device has been confirmed to be pointed at the target device.

Figure 11:
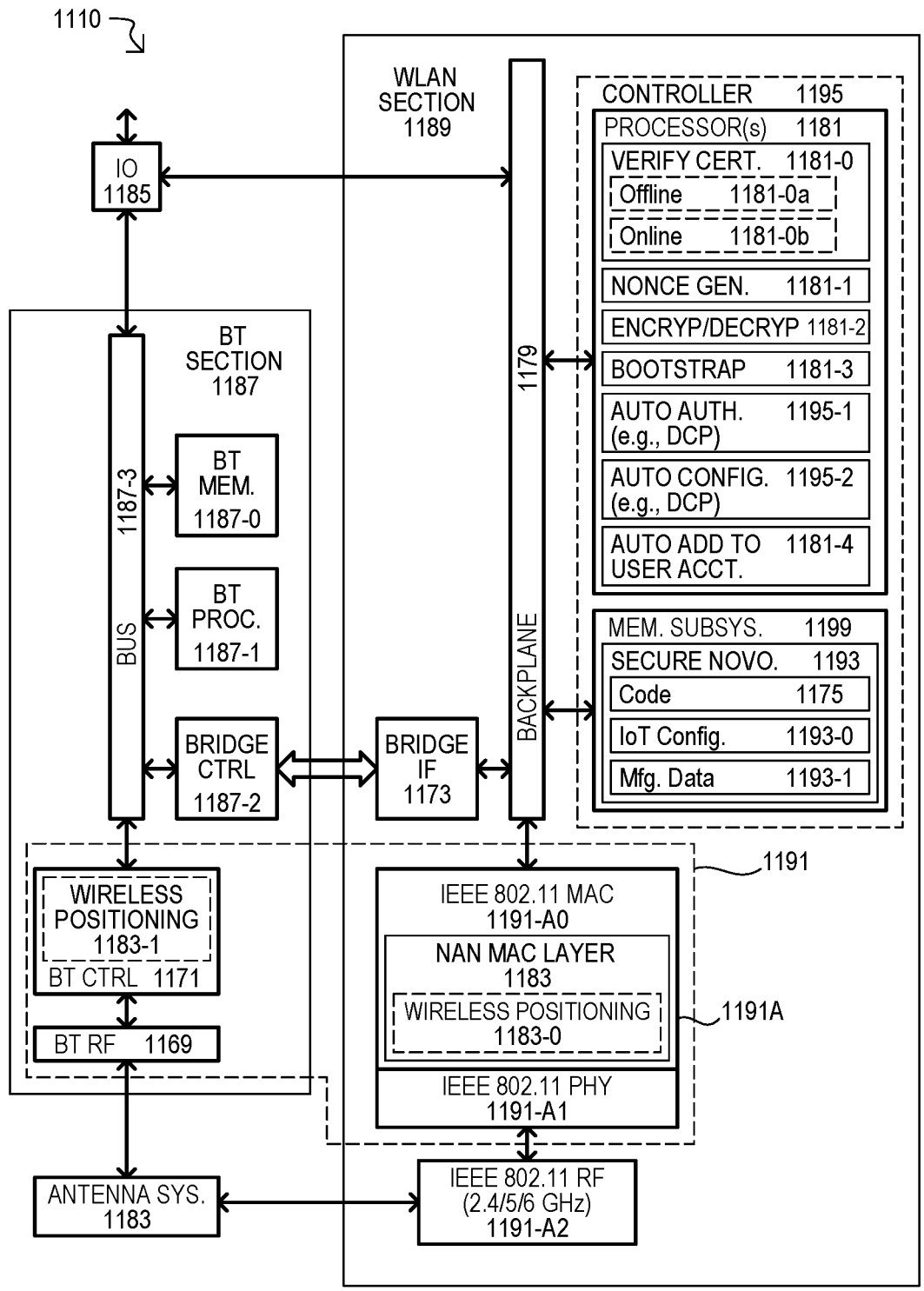
FIG. 11 is a block diagram of a target device according to another embodiment.

FIG. 11 shows a target device 1110 according to another embodiment. A target device 1110 can be a combination device that includes a WLAN section 1189, a BT section 1187, input/output (IO) circuits 1185. A target device 1191 can have wireless circuits 1191 formed with portions of the WLAN section 1189 and BT section 1187. A target device 1110 can also operate with an antenna system 1183.

A WLAN section 1189 can include a controller section 1195 in communication with a bridge interface 1173, IEEE 801.11 wireless circuits 1191, and IO circuits 1185 over a backplane 1179. A controller section 1195 can include a processor subsystem 1181 and memory subsystem 1177. A processor subsystem 1181 can execute code 1175 stored in memory system 1199 to provide various functions for the target device 1110. Such functions can include, but are not limited to: certificate verification 1181-0, nonce generation 1181-1, encryption/decryption 1181-2, bootstrapping 1181-3, automatic authentication 1195-1, automatic configuration 1195-2, and automatic user account creation/update 1181-4. Certificate verification 1181-0 can verify a digital certificate received from a configurator. Such verification operations can include offline verification 1181-0a and online verification 1181-0b. Offline verification 1181-0a can include, after detecting a digital certificate in a transmission of a configurator, accessing manufacturer authentication data 1193-1 (securely stored in memory subsystem 1199) to authenticate the digital certificate. Online verification 1181-0b can include, after detecting a digital certificate in a transmission of a configurator, accessing a remote server to retrieve data for authenticating the digital certificate. In some embodiments, such online authentication 1181-0b can include requesting a secure relay from a configurator. In alternate embodiments, if a target device has 1110 Internet access, online authentication 1181-0b can include a target device 1110 contacting a known good server directly to retrieve data used in authenticating a configurator digital certificate.

Nonce generator 1181-1 can generate nonce values which can be included in one or more transmissions to a configurator device, which can ensure the integrity of communications with a configurator. In some embodiments, such nonce values can be used to encrypt and/or otherwise ensure the integrity (e.g., MIC) of wireless position data sets transmitted to configurator. Encryption/decryption 1181-2 functions can perform encryption and decryption functions as described herein, including those using a public key infrastructure. Bootstrapping 1181-3 can initiate communication protocols with a configurator to enable automatic configuration of a target device (e.g., add the target device to an existing network). As described herein, in some embodiments, such an action can include a target device 1110 transmitting bootstrapping data equivalent to that generated from a DCP (e.g., data that would otherwise be provided by a QR code, NFC chip), but not include any user data input or action.

Automatic authentication 1195-1 and automatic authentication 1195-2 can take the form of those described herein, including proprietary or existing DCPs (e.g., Wi-Fi Easy Connect). In some embodiments, such automatic operations can start after any of: a configurator has determined it is pointing at (e.g., has LOS with) target device 1110, a target device 1110 has determined it is pointing at a configurator, or both.

Automatic user account creation/update 1181-4 can include a target device 1110 determining if a user account exists. If a user account does not exist, target device 110 can create an account for the user. Such an action can include the target device 1110 contacting an appropriate server directly, if it has Internet access, or via a secure connection through a configurator. If a user account does exist, a target device 1110 can add itself to such account with user account data provided by a configurator. Such an action can include a target device 1110 notifying a user when it has added itself to a network and/or user account.

A memory subsystem 1199 can include memory circuits for enabling operations of the target device 1110. A memory subsystem 1199 can include a secure nonvolatile memory 1193, and optionally volatile memory (not shown). A secure nonvolatile memory 1193 can store code 1175 for execution by a processor section 1181 to provide the various functions noted, configuration data 1193-0 and manufacturer installed data 1193-1. Configuration data 1193-0 can include network configuration data provided by a configurator in an automatic configuration operation, and can take the form of that described herein and equivalents. Configuration data 1193-0 can enable target device to operate in a wireless network after it has been automatically configured by a configurator. Manufacturer data 1193-1 can be installed when the target device 1110 is manufactured, and can be accessed by a target device in an offline certificate verification operation 1181-0*a* to verify a configurator digital certificate. In some embodiments, such data can be a database that can be updated in an online certificate verification operation 1181-0*b*.

A bridge interface 1173 can enable communications between WLAN section 1189 and BT section 1187.

IEEE 802.11 wireless circuits 1191A can provide wireless communications compatible with one or more IEEE 802.11 wireless standards. Wireless circuits 1191A can include a MAC layer circuits 1191A-0 and physical layer (PHY) circuits 1191A-1. In some embodiments, MAC layer circuits 1191A-0 can be configured with a neighbor aware network (NAN) MAC layer 1183 capable of executing one or more wireless positioning protocols 1183-0. PHY circuits 1191A1 can operate with IEEE 802.11 RF circuits 1191-A2, which can enable the transmission of communications compatible with one or more IEEE 802.11 standards, on any suitable band, including but not limited to 2.4 GHz, 5 GHz and/or 6 GHz.

A BT section 1187 can include BT memory section 1187-0, BT processor section 1187-1, bridge control circuit 1187-2 and BT communication control circuits 1171 in communication over a bus 1187-3. BT memory and processor sections (1187-0/1) can include instructions and processors for providing BT communication functions. BT communication control circuits 1171 can enable communications according to one or more BT standards. In some embodiments, BT control circuits 1171 can execute wireless positioning operations 1183-1, including but not limited to AoD and AoA measurements. BT section 1187 can also include BT RF circuits 1169 that can include radio circuits compatible with one or more BT standards, including receiving and transmitting packets according to a BT standard.

IO circuits 1185 can enable control of a target device 1110 from sources external to the device. IO circuits 1185 can enable communication with the device according to any suitable fashion. In some embodiments, IO circuits 1185 can include serial communication circuits, including but not limited to: serial digital interface (SDI), universal serial bus (USB), universal asynchronous receiver transmitter (UART), I2C, or I2S.

A device 1110 can operate in conjunction with an antenna system 1183 having multiple antennas compatible with one or more BT standards and one or more IEEE wireless standards.

While wireless positioning data can be generated by IEEE 802.11 compatible circuits 1191A or BT circuits (1171, 1169), in some embodiments, wireless positioning data from both such sources can be used in wireless positioning operations that determine an orientation of a configurator with respect to a target device 1110.

In some embodiments, WLAN section 1189, BT section 1187 and IO circuits 1185 can be formed with a same integrated circuit.

In this way, a target device can generate wireless position data with multiple protocols and transmit such data to a configurator to confirm the configurator is pointed at it before executing an automatic configuration operation.

A configurator according to embodiments can take any suitable form, including any device that can point at a target device to be automatically configured, and execute the automatic configuration operations as described herein or equivalents. A configurator can be pointed in its entirety, or can have a portion (e.g., wearable section or wired piece, such as a wand) that can point at a target device. In some embodiments, a configurator can be a handheld electronic device.

FIG. 12A is a diagram of a configurator 1212A according to an embodiment. A configurator 1212A can be a "smart phone" device having wireless circuits 1274A formed therein, as well as a resident configuration application 1270-1A. Such a configuration application 1270-1A can operate with wireless circuits 1274A to perform automatic configuration operations as described herein and equivalents. In some embodiments, a configurator 1212A can be one implementation of that shown in FIG. 8 or 9.

FIG. 12B is a diagram of a configurator 1212B according to another embodiment. A configurator 1212B can be a remote control type device having wireless circuits 1274B and a configurator application 1270-1B, such as firmware instructions executable by processor circuits (not shown) within the configurator 1212B. In the embodiment shown, configurator 1212B can include a pointing indication 1276B to show a user how to orient a configurator 1212B in an automatic configuration operation.

It is understood that FIGS. 12A and 12B are but two of numerous possible implementations of a configurator according to embodiments.

In this way, a configurator device can be a handheld device that can be easily pointed at a target device in an automatic configuration operation.

In some embodiments, it may be desirable to provide greater directional control over wireless positioning signals used in an automatic configuration operation as described herein. Accordingly, embodiments anticipate the inclusion or addition of a wireless signal direction structure 1367, which can restrict a direction of wireless signals that are transmitted and/or received to a pointing direction 1365. A wireless signal direction structure 1367 can take any suitable form, and in some embodiments can include a directional antenna (e.g., 1367*a*, 1367*b*) or antenna array (e.g., 1367*c*). As understood from descriptions herein, a pointing direction 1365 can be determined by antenna structures of a configurator 1312.

In this way, a configurator can include a feature that can direct the reception and/or transmission of wireless signals to improve signal strength for wireless positioning data in a LOS to a target device.

While embodiments can include devices and systems with various interconnected components, embodiments can also include unitary devices which can execute configurator and/or target device functions as described herein. In some embodiments, such unitary devices can be advantageously compact single integrated circuits (i.e., chips). FIG. 14 shows a packaged single chip device, which can operate as a configurator 1412 or target device 1410 as described herein and equivalents. A single chip device 1410/1412 can take the form of those shown in FIG. 8, 9, 10 or 11.

However, it is understood that a device according to embodiments can include any other suitable integrated circuit packaging type, as well as direct bonding of a device chip onto a circuit board or substrate.

In this way, a configurator and/or target device can be provided with a single integrated circuit solution.

Figure 15:
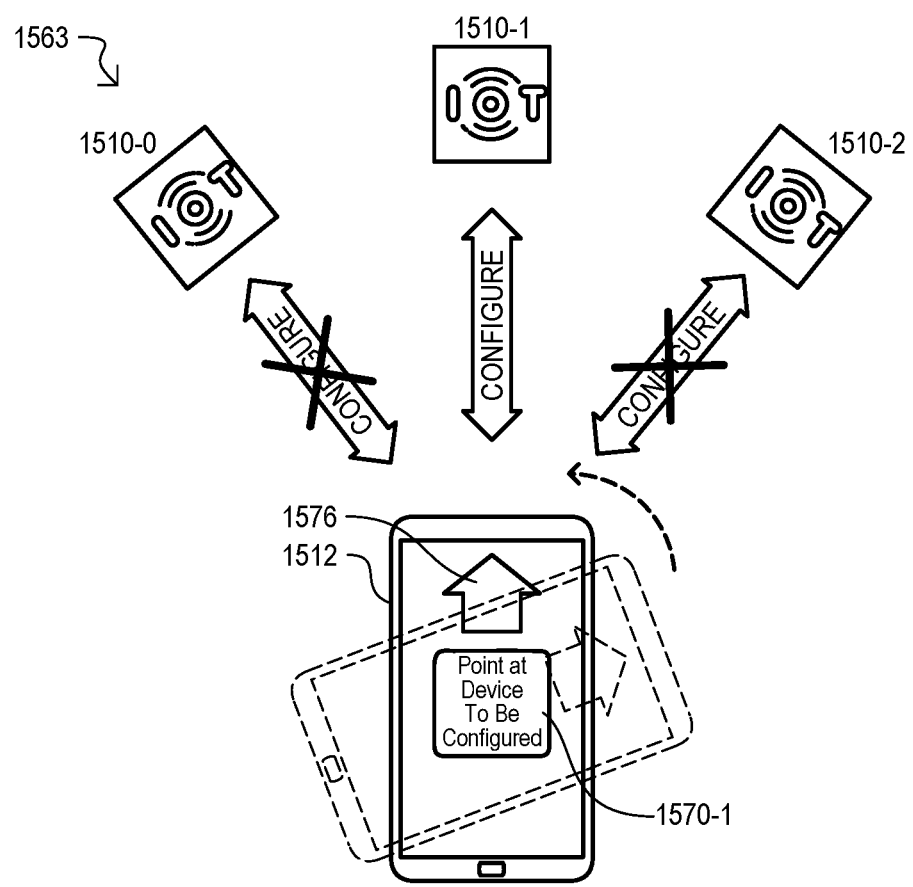
FIG. 15 is a diagram of a system showing configuration operations with security assurance provided with line of sight (LOS) between devices according to an embodiment.

FIG. 15 is a diagram showing a system 1563 according to another embodiment. A system 1563 can include a number of target devices 1510-0 to 1510-2 and a configurator 1512. A configurator 1512 can include an automatic configuration application 1570-1 that can generate a pointing direction indicator 1576 for a user.

An operation of system 1563 can include initial communications for configuration operations. Such initial communications can include an advertisement for configuration services from a configurator 1512 and/or requests for configuration from a target device (1510-0 to -2). Such initial communications can indicate to configurator 1512 that target devices (1510-0 to -2) can be configured. However, any automatic configuration operation cannot proceed unless there is confirmation that the configurator 1512 is pointed at a responding target device (1510-0 to -2).

Referring still to FIG. 15, while configurator 1512 is pointed at target device 1510-1, target device 1510-1 can be automatically configured with configurator 1512 (represented by configure action 1553). In contrast, when configurator 1512 is pointed at target device 1510-1, it is not pointed at target devices 1510-0 or 1510-2. Thus, even if target devices 1510-0 or 1510-2 can have detected or responded to a configuration advertisement (including validating a digital certificate of configurator 1512), such target devices 1510-0 or -2 do not have a LOS to the configurator 1512, and so configuration operations will be stopped or never started (represented by "no configuration" 1555).

In this way, the pointing of a configurator can be used to assure security when a new device is added to an existing network.

FIGS. 16A to 16G are diagrams showing operations of a configurator 1612 according to embodiments. FIG. 16A shows how a configurator 1612 can be a smart phone or tablet type device having a configuration application 1670-1 installed thereon. FIG. 16B shows how activation of a configuration application 1670-1 can result in a user authentication operation 1670-0. While FIG. 16B shows a user authentication operation 1670-0 that includes biometric security, alternate embodiments can include any other authentication types, including two-factor authentication.

FIG. 16C shows how an application 1670-1 can provide network information 1659-0 for a network to which a target device can be added. In the embodiment shown, network information can identify the network, as well as devices currently connected to the network. FIG. 16D shows possible configuration options for a configuration application 1670-1. Such options can include configuring a new device for a network 1659-1, as well as any other suitable actions.

FIG. 16E shows a pointing indication 1676 that can be generated by a configuration application 1670-1. A user can use such a pointing indication 1676 to point configurator 1612 at a target device for configuration. Referring to FIG. 16F, with configurator 1612 pointed at a target device, configurator and the target device can use wireless positioning data, as described herein or equivalents, to confirm LOS (and optionally distance) between the two devices. The configurator 1612 can then execute an automatic authentication operation 1680-1 and automatic configuration operation 1680-2, as described herein and equivalents. Such operations can automatically configure the target device at which the configurator 1612 is pointed. Such operations can include an existing or proprietary DCP. However, such actions may not include any user action. FIG. 16G shows how, following a successful configuration operation, a newly added target device 1610 (i.e., the target device that was pointed at) can be included in network information 1659-0'.

In this way, a configurator can include an application that can display a network and automatically add a target device to the network by being pointed at the target device.

Figure 17:
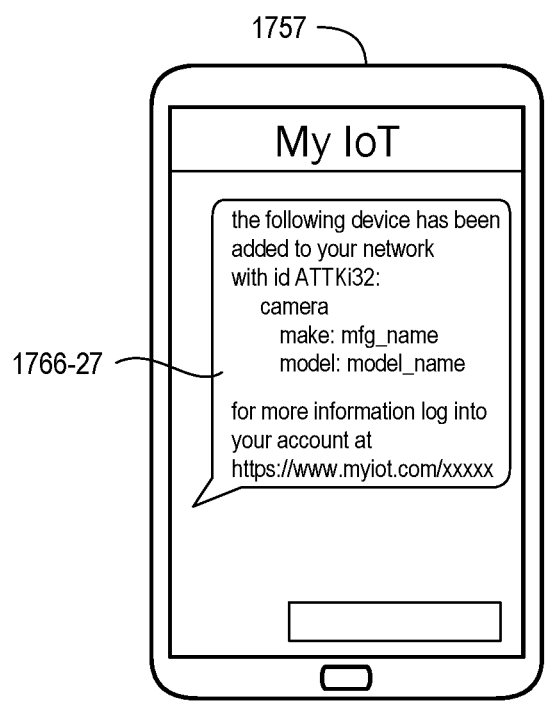
FIG. 17 is a diagram of a post configuration user notification according to an embodiment.

FIG. 17 is a diagram of a user device 1757 notification 1766-27 according to an embodiment. A user device 1757 can receive a notification 1766-27 from a target device after the target device has been added to the user's network. As described for embodiments herein, following the automatic configuration of a user device by pointing a configurator at the target device, the target device can send a notification to a user. Such a notification can be generated with user information provided by a configurator.

In some embodiments, a user device 1757 can be portable electronic device, and a notification can be any suitable electronic message, including but not limited to a text or email message.

In this way, following an automatic configuration operation with security assurance with LOS confirmation, a target device can send a notification to a predetermined location.

Figure 18:
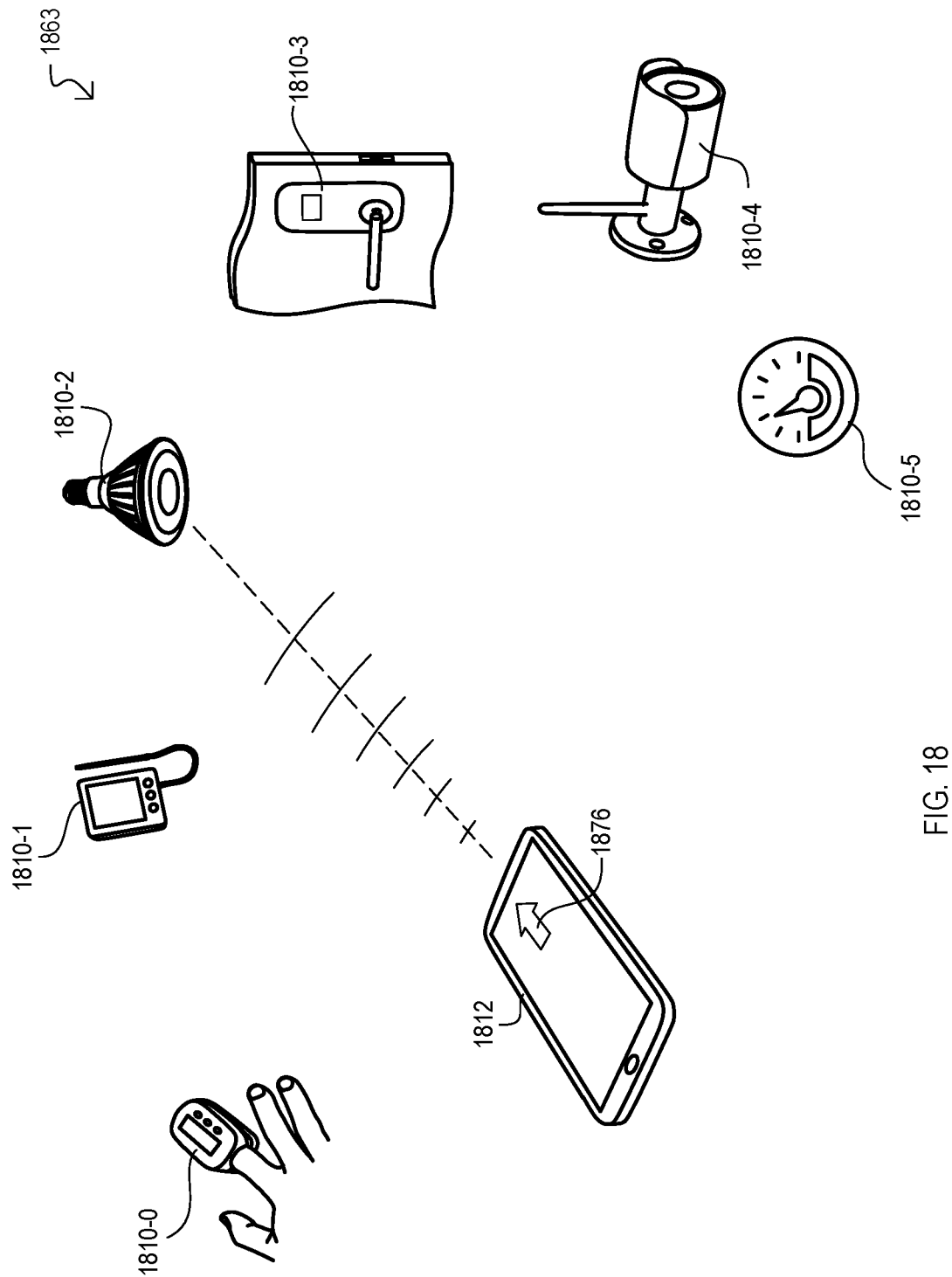
FIG. 18 is a diagram of a system that includes Internet-of-thing (IoT) devices that can be automatically configured for a network with a configurator using LOS assurance according to embodiments.

FIG. 18 shows a system 1863 according to another embodiment. A system 1863 can include a configurator 1812 and various target devices 1810-0 to -5. Target devices (1810-0 to -5) can execute automatic configuration methods as described herein, including but not limited to those shown in FIGS. 2, 3A-3C, 4 and 7A-7C.

In the embodiment shown, target devices (1810-0 to -5) can be "Internet-of-things" (IoT) type devices, including but not limited to: medical devices 1810-0/1, lighting devices 1810-2, security devices 1896-3/4, or instrumentation devices 1050-5. Configurator 1812 can advertise automatic configuration services (or respond to requests for configuration).

Using a pointing indication 1876, a configurator 1812 can be pointed at a target device (1810-2). Provided the target device being pointed at (1810-2) is seeking configuration, the target device 1810-2 can be automatically configured with configurator 1812 as described herein and equivalents (e.g., automatically configured if wireless position data confirms LOS between the two devices).

In this way, IoT type devices can be automatically configured with security assurance provided by LOS between the configuring device and the IoT device to be configured.

Embodiments can include methods, devices and systems that include, by operation of a configuring device: storing user network information in the configuring device; receiving wireless communications from a target device to be configured; authenticating the target device with data from the wireless communications; indicating a pointing direction for the configuring device; executing a wireless positioning operation with the target device to generate positioning data, the positioning data indicating a position of the target device with respect to the configuring device. In response to the configuring device being determined to be pointing at the target device, the target device can be automatically configured for the user network with the stored user network information.

Methods devices and systems according to embodiments can include authenticating a user to the configuring device.

Methods devices and systems according to embodiments can include, by operation of the configuring device, wirelessly broadcasting information identifying an automatic configuration operation provided by the configuration device.

Methods devices and systems according to embodiments can include, by operation of the configuring device, in response to a request from a target device, establishing a secure connection between the target device and a configuration server.

Methods devices and systems according to embodiments can include, positioning data being any of: channel state information, angle of attack measurements, angle of departure measurements and fine time measurements.

Methods devices and systems according to embodiments can include, by operation of a target device, transmitting wireless communications to the configuring device in response to a broadcast from the configuring device.

Methods devices and systems according to embodiments can include, by operation of a target device, authenticating the configuring device before executing a wireless positioning operation with the configuring device Methods devices and systems according to embodiments can include, by operation of the target device, receiving a digital certificate from the configuring device that identifies the configuring device, and if a key for the configuring device is not stored by the target device, requesting a secure connection to a server through the configuring device.

Methods devices and systems according to embodiments can include, by operations between the target device and configuring device, any of: generating and encrypting a nonce value, sending a request to start a wireless positioning protocol to the other device that includes the encrypted nonce value, and acknowledging sets of position data received from the other device.

Methods devices and systems according to embodiments can include, wireless communication circuits configured to execute at least one wireless positioning protocol; secure nonvolatile memory configured to store user network data; and controller circuits. The controller circuits can be configured to wirelessly communicate with a target device, authenticate the target device, execute at least one wireless positioning protocol with the target device to generate position data. If the position data indicates the device is pointing at the target device, controller circuits can automatically configure the target device to operate with the user network data using the stored user network data.

Methods devices and systems according to embodiments can include wireless communication circuits are compatible with at least one IEEE 802.11 wireless standard.

Methods devices and systems according to embodiments can include an antenna system.

Methods devices and systems according to embodiments can include controller circuits configured to generate advertisement transmissions that include a device digital certificate and an indication of automatic configuration capabilities.

Methods devices and systems according to embodiments can include a handheld device with a display; and the controller circuits configured to generate the pointing direction on the display.

Methods devices and systems according to embodiments can include wireless communication circuits configured to execute at least one wireless positioning protocol; secure nonvolatile memory configured to receive and store network configuration data for the device; and controller circuits. Controller circuits can be configured to wirelessly communicate with a configuring device, authenticate the configuring device, and execute at least one wireless positioning protocol with the configuring device to generate position data. If the position data indicates that the configuring device is pointing at the device, controller circuits can configure the device to operate with a network with configuration data received from the configuring device.

Methods devices and systems according to embodiments can include a secure nonvolatile memory configured to store keys for different configuring devices.

Methods devices and systems according to embodiments can include wireless communication circuits, secure nonvolatile memory, and controller circuits formed with a same integrated circuit substrate.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
by operation of a configuring device:
storing user network information for a user network in the configuring device;
receiving wireless communications from a target device to be configured;
authenticating the target device with data from the wireless communications;
indicating a pointing direction for the configuring device;
executing a wireless positioning operation with the target device to generate positioning data, the positioning data indicating a position of the target device with respect to the configuring device; and
in response to the configuring device being determined to be pointing at the target device, automatically configuring the target device for the user network with the stored user network information.

2. The method of claim 1, further including authenticating a user to the configuring device.

3. The method of claim 1, further including: by operation of the configuring device, wirelessly broadcasting information identifying an automatic configuration operation provided by the configuration device.

4. The method of claim 1, further including, by operation of the configuring device, in response to a request from the target device, establishing a secure connection between the target device and a configuration server.

5. The method of claim 1, wherein the positioning data includes any selected from the group of: channel state information, angle of attack measurements, angle of departure measurements and fine time measurements.

6. The method of claim 1, further including, by operation of the target device, transmitting the wireless communications to the configuring device in response to a broadcast from the configuring device.

7. The method of claim 1, further including, by operation of the target device, authenticating the configuring device before executing the wireless positioning operation by the configuring device.

8. The method of claim 1, further including:
by operation of the target device,
receiving a digital certificate from the configuring device that identifies the configuring device, and
if a key for the configuring device is not stored by the target device, requesting a secure connection to a server through the configuring device.

9. The method of claim 1, wherein:
executing the wireless positioning operation includes, by operation of the target device:
generating and encrypting a nonce value for the target device to be configured,
sending a request to start a wireless positioning protocol to the configuring device that includes the encrypted nonce value, and
acknowledging sets of position data received from the configuring device.

10. The method of claim 1, wherein:
executing the wireless positioning operation includes, by operation of the configuring device:
sending a request to start a wireless positioning protocol to the target device, and
acknowledging sets of position data received from the target device.

11. A device for automatically configuring a target device, comprising:
wireless communication circuits configured to execute at least one wireless positioning protocol;
secure nonvolatile memory configured to store user network data for a user network; and
controller circuits configured to
wirelessly communicate with a target device,
authenticate the target device,
execute, with the wireless communication circuits, the at least one wireless positioning protocol with the target device to generate position data, and
if the position data indicates the device is pointing at the target device, automatically configure the target device to operate with the user network using the stored user network data.

12. The device of claim 11, wherein the wireless communication circuits are compatible with at least one IEEE 802.11 wireless standard.

13. The device of claim 11, further including:
an antenna system comprising a plurality of antennas; and
the position data is selected from the group of: Wi-Fi channel state information, Wi-Fi fine time measurement, Bluetooth Low Energy angle of attack, and Bluetooth Low Energy angle of departure.

14. The device of claim 11, wherein the controller circuits are configured to generate advertisement transmissions that include a device digital certificate and an indication of automatic configuration capabilities.

15. The device of claim 11, wherein:
the device comprises a handheld device with a display; and
the controller circuits are configured to generate the pointing direction on the display.

16. A device, comprising:
wireless communication circuits configured to execute at least one wireless positioning protocol;
secure nonvolatile memory configured to receive and store network configuration data for the device; and
controller circuits configured to
wirelessly communicate with a configuring device,
authenticate the configuring device,
execute, with the wireless communication circuits, the at least one wireless positioning protocol with the configuring device to generate position data, and
if the position data indicates that the configuring device is pointing at the device, configuring the device to operate with a network using the received and stored network configuration data.

17. The device of claim 16, wherein the secure nonvolatile memory is further configured to store keys for different configuring devices.

18. The device of claim 11, wherein:
the controller circuits are further configured to
generate and encrypt a nonce value, and
transmit the encrypted nonce value to the configuring device in a request to execute the at least one wireless positioning protocol with the configuring device.

19. The device of claim 11, wherein:
the controller circuits are further configured to
receive wireless positioning data sets from the configuring device,
generate wireless positioning data sets, and
transmit the generated wireless positioning data sets to the configuring device.

20. The device of claim 11, wherein the wireless communication circuits, secure nonvolatile memory, and controller circuits are formed with a same integrated circuit substrate.

* * * * *